(12) United States Patent
Davis et al.

(10) Patent No.: US 8,813,144 B2
(45) Date of Patent: Aug. 19, 2014

(54) QUALITY FEEDBACK MECHANISM FOR BANDWIDTH ALLOCATION IN A SWITCHED DIGITAL VIDEO SYSTEM

(75) Inventors: Scott M. Davis, Tega Cay, SC (US); Tom Gonder, Tega Cay, SC (US); Paul Brooks, Weddington, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 94 days.

(21) Appl. No.: 12/987,247

(22) Filed: Jan. 10, 2011

(65) Prior Publication Data
US 2012/0180101 A1 Jul. 12, 2012

(51) Int. Cl.
*H04N 7/173* (2011.01)
*H04J 3/00* (2006.01)
*H04J 3/16* (2006.01)

(52) U.S. Cl.
USPC ............. 725/96; 725/90; 725/95; 725/98; 370/464; 370/468

(58) Field of Classification Search
CPC .......... H04N 21/23655; H04N 21/238; H04N 21/2385; H04N 21/24; H04N 21/64738
USPC .................................. 725/94, 95, 96
See application file for complete search history.

(56) References Cited

U.S. PATENT DOCUMENTS

| | | | |
|---|---|---|---|
| 2003/0056217 A1 | 3/2003 | Brooks | |
| 2005/0216815 A1* | 9/2005 | Novotny et al. | 714/758 |
| 2006/0095943 A1* | 5/2006 | Demircin et al. | 725/81 |
| 2006/0130107 A1 | 6/2006 | Gonder | |
| 2007/0076728 A1 | 4/2007 | Rieger | |
| 2007/0088516 A1* | 4/2007 | Wolf et al. | 702/81 |
| 2007/0204067 A1* | 8/2007 | Walker et al. | 709/247 |
| 2008/0320540 A1 | 12/2008 | Brooks | |
| 2009/0025052 A1* | 1/2009 | Schlack et al. | 725/116 |
| 2009/0031384 A1* | 1/2009 | Brooks et al. | 725/127 |
| 2012/0114046 A1* | 5/2012 | Gordon | 375/240.25 |

OTHER PUBLICATIONS

"ITS Video Quality Research" downloaded from http://www.its.bldrdoc.gov/n3/video/standards/ on Jan. 7, 2011.
"Mean opinion score" downloaded from http://en.wikipedia.org/wiki/Mean_opinion_score on Jan. 7, 2011.
"A System for Controling the state of a Switched Digital Video System and Method Therefor" by Remi Rieger, et al. unpublished U.S. Appl. No. 12/556,840, filed Sep. 10, 2009.

* cited by examiner

*Primary Examiner* — Nasser Goodarzi
*Assistant Examiner* — Kyu Chae
(74) *Attorney, Agent, or Firm* — Otterstedt, Ellenbogen & Kammer, LLP

(57) ABSTRACT

A method is provided which is suitable for implementation in a switched digital video content-based network, wherein a head end obtains a first group of program streams and sends to a client only a subset of the program streams selected by subscribers in a neighborhood of the client. At least one of imminence and presence of a condition of inadequate bandwidth is determined. Responsive to the determining of the at least one of imminence and presence of the condition of inadequate bandwidth, a bit rate of at least one of the subset of the program streams selected by the subscribers in the neighborhood of the client is dynamically decreased by adjusting encoding thereof, while maintaining adequate quality for the at least one of the subset of the program streams selected by the subscribers in the neighborhood of the client, based on an objective quality measure, in order to address the at least one of imminence and presence of the condition of inadequate bandwidth.

29 Claims, 17 Drawing Sheets

5000

| X | $N_{PCHX}$ | ASSIGNED CARRIER |
|---|---|---|
| 1 | 0 | NULL |
| 2 | 12 | $C_3$ |
| 3 | 1 | $C_{11}$ |
| ⋮ | ⋮ | ⋮ |
| K | 5 | $C_{25}$ |

5004 5006 5008
5013 { (row 1)
5011 { (row 2)

| STID | ... | $PCH_{NEW}$ | $PCH_{OLD}$ | ... |

| VOD SERVICE GROUP – 4 RF CHANNELS | | | | QAM BANDWIDTH | |
|---|---|---|---|---|---|
| QAM 1 | QAM 2 | QAM 3 | QAM 4 | Mbps | |
| 28 | 32 | 36 |  | 37.5 | ↑ |
| 27 | 31 | 35 | 37 | 33.75 | HD RATE |
| 26 | 30 | 34 |  | 30 | 15 Mbps |
| 25 | 29 | 33 |  | 26.25 | ↓ |
| 21 | 22 | 23 | 24 | 22.5 | VType(1)_THRESHOLD |
| 17 | 18 | 19 | 20 | 18.75 | |
| 13 | 14 | 15 | 16 | 15 | |
| 9 | 10 | 11 | 12 | 11.25 | |
| 5 | 6 | 7 | 8 | 7.5 | |
| 1 | 2 | 3 | 4 | 3.75 | |

SD  3.75 Mbps     HD  15 Mbps

*FIG. 17*

| VOD SERVICE GROUP – 4 RF CHANNELS | | | | QAM BANDWIDTH | |
|---|---|---|---|---|---|
| QAM 1 | QAM 2 | QAM 3 | QAM 4 | Mbps | |
| 30 |  |  | 34 | 37.5 | ↑ |
| 28 | 26 | 29 | 33 | 33.75 | HD RATE |
| 27 |  |  | 32 | 30 | 15 Mbps |
| 25 |  |  | 31 | 26.25 | ↓ |
| 21 | 22 | 23 | 24 | 22.5 | VType(1)_THRESHOLD |
| 17 | 18 | 19 | 20 | 18.75 | |
| 13 | 14 | 15 | 16 | 15 | |
| 9 | 10 | 11 | 12 | 11.25 | |
| 5 | 6 | 7 | 8 | 7.5 | |
| 1 | 2 | 3 | 4 | 3.75 | |

SD  3.75 Mbps     HD  15 Mbps

QUALITY FEEDBACK MECHANISM FOR BANDWIDTH ALLOCATION IN A SWITCHED DIGITAL VIDEO SYSTEM

FIELD OF THE INVENTION

The present invention relates generally to the electrical, electronic, and computer arts, and more particularly relates to video content networks.

BACKGROUND OF THE INVENTION

With the advent of digital communications technology, many TV program streams are transmitted in digital formats. For example. Digital Satellite System (DSS), Digital Broadcast Services (DBS), and Advanced Television Standards Committee (ATSC) program streams are digitally formatted pursuant to the well-known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

A video content network, such as a cable television network, may provide many different services; for example, free on demand, movies on demand, subscription video on demand, switched digital video, and the like. In at least some instances, a user begins watching program material by requesting establishment of a session, such as a switched digital video session. In at least some cases, there may be inadequate bandwidth to establish the requested new session and also maintain all existing sessions. Thus, network bandwidth allocation is of interest in many cases.

SUMMARY OF THE INVENTION

A quality feedback mechanism is disclosed for bandwidth allocation in a switched digital video system.

In one aspect, an exemplary method, suitable for implementation in a switched digital video content-based network, wherein a head end obtains a first group of program streams and sends to a client only a subset of the program streams selected by subscribers in a neighborhood of the client, includes the steps of determining at least one of imminence and presence of a condition of inadequate bandwidth; and, responsive to the determining of the at least one of imminence and presence of the condition of inadequate bandwidth, dynamically decreasing a bit rate of at least one of the subset of the program streams selected by the subscribers in the neighborhood of the client by adjusting encoding thereof, while maintaining adequate quality for the at least one of the subset of the program streams selected by the subscribers in the neighborhood of the client, based on an objective quality measure, in order to address the at least one of imminence and presence of the condition of inadequate bandwidth.

In another aspect, an apparatus is provided for use in a switched digital video content-based network, wherein a head end obtains a first group of program streams and sends to a client only a subset of the program streams selected by subscribers in a neighborhood of the client. The apparatus includes an encoder bank which encodes a plurality of input video streams into a plurality of output video streams. The plurality of input video streams and the plurality of output video streams correspond to the subset of program streams. The apparatus also includes a video quality sensing system which determines an objective measure of quality for at least the output video streams; an encoder management system coupled to the encoder bank and the video quality sensing system; and a switched digital video bandwidth manager coupled to the encoder management system. The switched digital video bandwidth manager is configured to determine, and signal to the encoder management system, at least one of imminence and presence of a condition of inadequate bandwidth in the switched digital video content-based network. Responsive to the signaling, the encoder management system is configured to dynamically decrease a bit rate of at least one of the subset of the program streams selected by the subscribers in the neighborhood of the client by adjusting encoding thereof, while maintaining, adequate quality for the at least one of the subset of the program streams selected by the subscribers in the neighborhood of the client, based on communication from the video quality sensing system indicative of the objective measure of quality, in order to address the at least one of imminence and presence of the condition of inadequate bandwidth.

As used herein. "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

These and other features and advantages of the invention will become apparent from the following detailed description of illustrative embodiments thereof, which is to be read in connection with the accompanying drawings.

BRIEF DESCRIPTION OF THE DRAWINGS

FIG. 16 shows a first exemplary session allocation;

FIG. 17 shows a second exemplary session allocation;

DETAILED DESCRIPTION OF PREFERRED EMBODIMENTS

Figure 1:
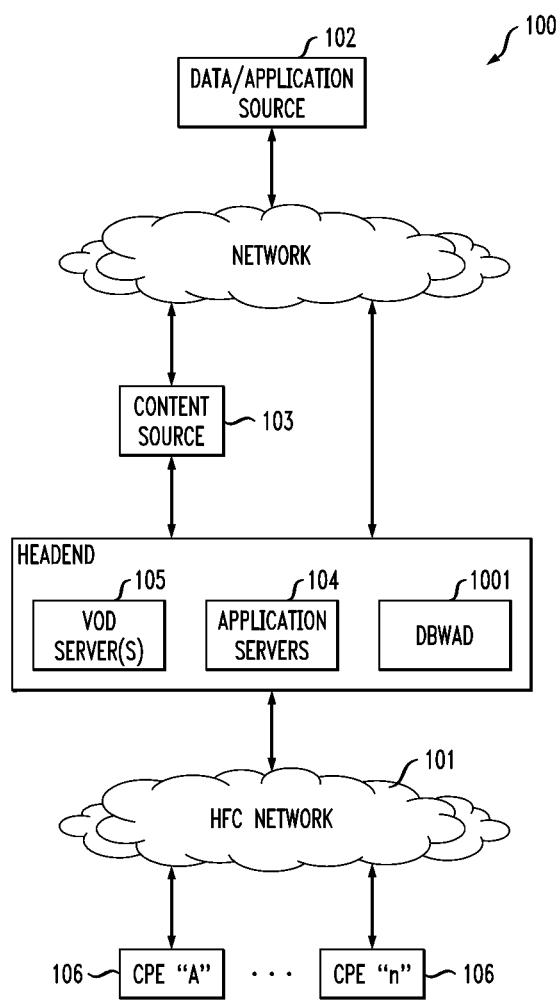
FIG. 1 is a functional block diagram illustrating an exemplary hybrid fiber-coaxial (HFC) network configuration.

FIG. 1 illustrates a typical content-based network configuration 100. Note that one or more embodiments are particularly pertinent for switched digital networks as discussed below. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. Also included is a dynamic bandwidth allocation device (DBWAD) 1001 such as a global session resource manager, which is itself a non-limiting example of a session resource manager, as discussed elsewhere herein. The distribution server(s) 104, VOD servers 105, DBWAD 1001, and CPE(s) 106 are connected via a bearer (e.g., hybrid fiber cable (HFC)) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 1A (described in greater detail below) may be used.

It should be noted at this point that in addition to a conventional HFC network or a switched digital network to be discussed below, other kinds of video content networks can be employed for network 101 (e.g. fiber-to-the-home (FTTH) or fiber-to-the-curb (FTTC)).

The data/application origination point 102 comprises any medium that allows data and/or applications (such as a VOD-based or "Watch TV" application) to be transferred to a distribution server 104 (for example, over a suitable network, not separately numbered). This can include for example a third party data source, application vendor website, compact disk read-only memory (CD-ROM), external network interface, mass storage device Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers per se are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104; for example, set-top terminal (STT), digital set-top box (DSTB), set-top box (STB), or simply "box," and the like.

Figure 1A:
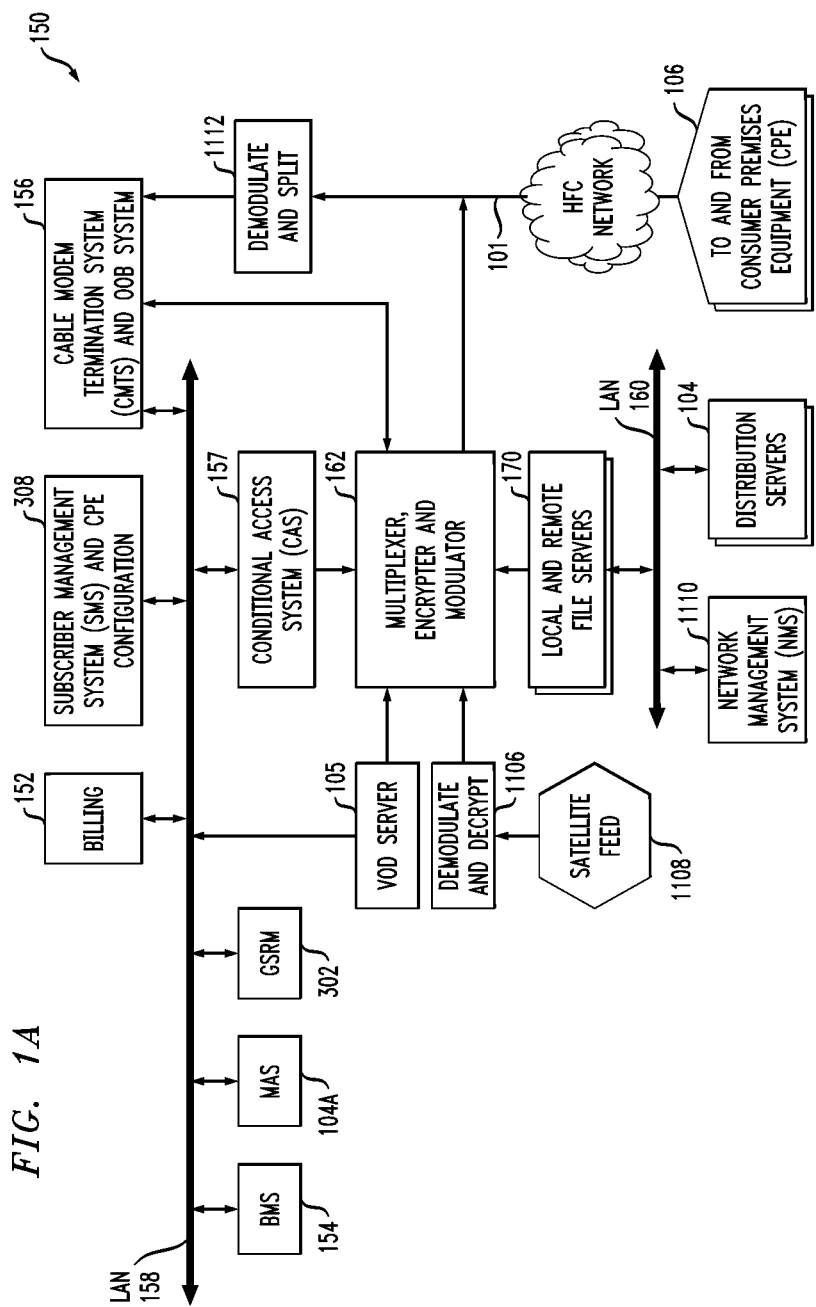
FIG. 1A is a functional block diagram illustrating one exemplary HFC cable network head-end configuration.

Referring now to FIG. 1A, one exemplary embodiment of a head-end architecture is described. As shown in FIG. 1A, the head-end architecture 150 comprises typical head-end components and services including billing module 152, subscriber management system (SMS) and CPE configuration management module 308, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1A is high-level, conceptual architecture and that each multi-service operator or multiple system operator (MSO) may have multiple head-ends deployed using custom architectures.

The architecture 150 of FIG. 1A further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1B) via a variety of interposed network components.

Content (e.g. audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 1A are a global session resource manager (GSRM) 302, a Mystro Application Server 104A, and a business management system 154, all of which are coupled to LAN 158, and discussed further below. GSRM 302 is one specific form of a DBWAD 1001 and is a non-limiting example of a session resource manager.

Figure 1B:
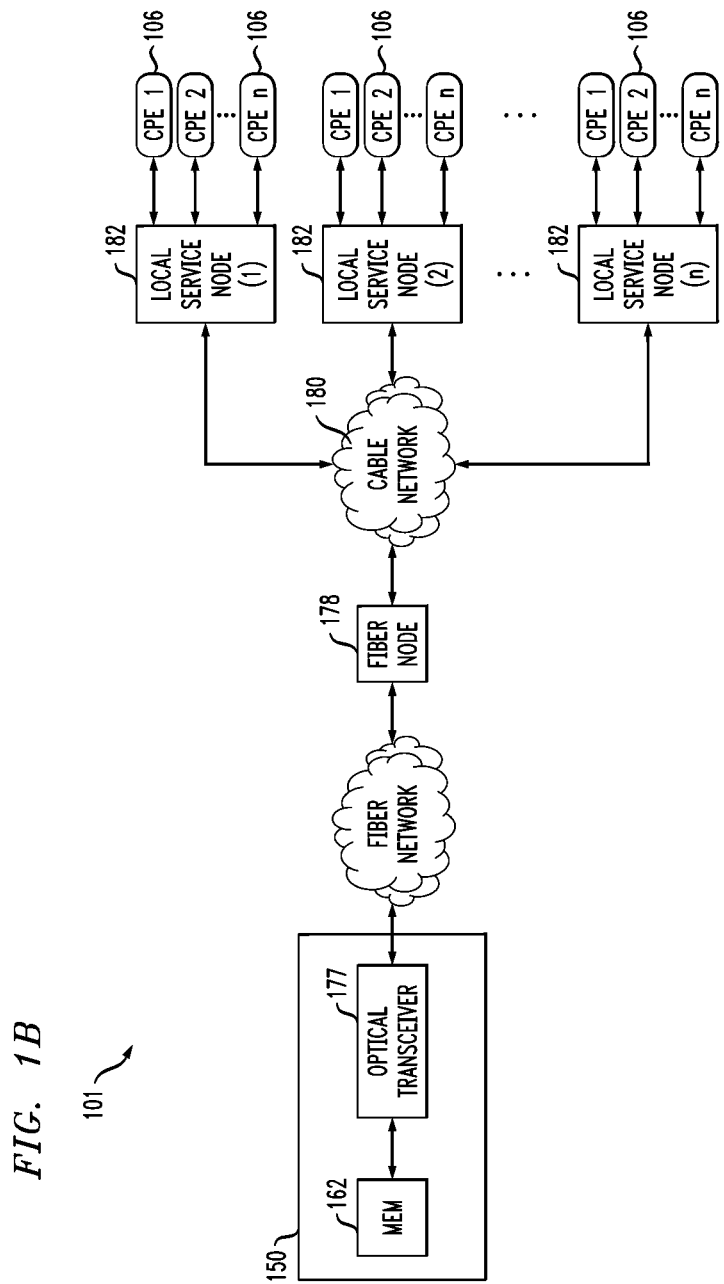
FIG. 1B is a functional block diagram illustrating one exemplary local service node configuration.

As shown in FIG. 1B, the network 101 of FIGS. 1 and 1A comprises a fiber/coax arrangement wherein the output of the MEM 162 of FIG. 1A is transferred to the optical domain (such as via an optical transceiver 177 at the head-end 150 or further downstream). The optical domain signals are then distributed to a fiber node 178, which further distributes the signals over a distribution network 180 to a plurality of local servicing nodes 182. This provides an effective 1:N expansion of the network at the local service end.

US Patent Publication 2003-0056217 of Paul D. Brooks, entitled "Technique for Effectively Providing Program Material in a Cable Television System." the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood.

Note that reference is made herein, for brevity, to features of the "Brooks invention"—it should be understood that no inference should be drawn that such features are necessarily present in all claimed embodiments of Brooks.

The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

Figure 2:
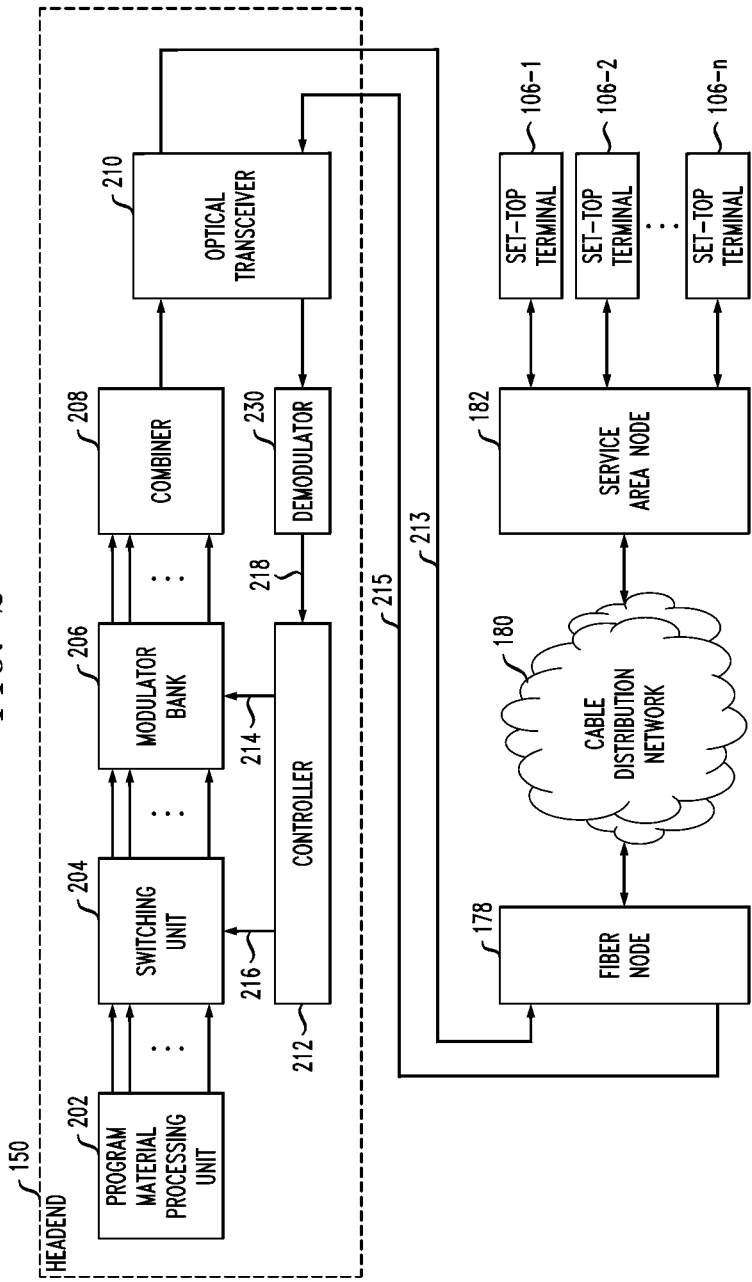
FIG. 2 is a block diagram of a "switched" hybrid fiber coax cable CATV system useful with one or more embodiments of the present invention.

FIG. 2 illustrates hybrid fiber coax (HFC) cable CATV system embodying the principles of the Brooks invention for providing program materials to set-top terminals on the subscriber premises. As shown in FIG. 2, the system includes head end 150, fiber node 178, cable distribution network 180, and service area node 182 which is connected to set-top terminals 106-1 through 106-$n$ in a neighborhood, where n is a predetermined number.

In head end 150, program material processing unit 202 receives program materials from various sources via satellites, terrestrial microwave transmissions, cable, etc. The program materials are processed by unit 202 to form K individual program data streams in a digital format, where K is an integer. Each program data stream contains program material, which requires a transmission channel having a specified frequency band for its distribution. In order to fully appreciate the Brooks invention, the term "transmission channel" used here should not be confused with a "program channel." A "transmission channel" signifies a designated frequency band through which a program data stream containing program material is transmitted. On the other hand, a "program channel" signifies the source of the program material selected by a subscriber to view. For example, a subscriber may select program channel 2 to view program material provided by CBS, program channel 14 to view program material provided by ESPN; program channel 32 to view program material provided by MTV, etc. In this instance, there are K program channels corresponding to the K program data streams.

In accordance with the Brooks invention, under control of controller 212, switching unit 204 selects and switches a subset of the K program data streams, say, p program data streams, to modulator bank 206, where p≤K. The program data streams in the subset are selected in a manner described below. Each selected program data stream is transmitted through a different transmission channel after it modulates a carrier associated with the transmission channel in a designated forward passband. As is well known, in the United States the designated forward passband for cable TV ranges from 50 MHz to 550 MHz.

Figure 3:
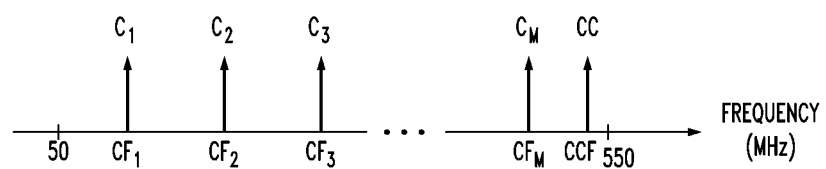
FIG. 3 illustrates selected carriers for transmitting program materials and control messages in a forward passband of the system of FIG. 2.

FIG. 3 illustrates M carriers. $C_1$ through $C_M$, associated with M transmission channels in the forward passband, respectively, which are pre-selected for use in this instance. Since the forward passband is limited in bandwidth, M in this instance represents the maximum number of carriers or transmission channels that the forward passband can accommodate. As shown in FIG. 3, the carrier frequency of $C_1$ is denoted $CF_1$; the carrier frequency of $C_2$ is denoted $CF_2$; . . . ; and the carrier frequency of $C_M$ is denoted $CF_M$. In addition, in accordance with the invention, a control carrier CC having a carrier frequency CCF is assigned to carry control messages by controller 212 to the set-top terminals through a control channel in the forward passband.

In prior art, each program channel is fixedly assigned to one of the M carriers for transmission of its program material. In addition, all of the program channels are simultaneously made available to each set-top terminal in a neighborhood. As a result, the number of program channels that a prior art CATV system can provide cannot exceed M. However, the Brooks invention overcomes the prior art limitations by dynamically assigning carriers to carry program materials of only those program channels selected by the set-top terminals (or subscribers) in a neighborhood. Advantageously, the number of program channels that the inventive CATV system can provide, although not simultaneously, can exceed M. That is, K can be greater than M in this instance.

Thus, in accordance with the Brooks invention, controller 212 communicates to switching unit 204 through link 216, causing unit 204 to switch, to modulator bank 206, the selected p program data streams which contain the program channel materials selected aggregately by the subscribers in the neighborhood. As long as p≤M, which is very likely stemming from the fact that the majority at a given time watch only a few particular favorite program channels, controller 212 manages to assign p carriers to carry the respective data streams. To that end, controller 212 also specifies to unit 204 the selected inputs of modulator bank 206 to which the p data streams are switched.

In this instance, modulator bank 206 includes conventional modulators. Each input to modulator bank 206 is fed to a different modulator for modulating the input onto one of the M carriers. The p data streams are switched by unit 204 to the appropriate inputs of modulator bank 206 to be modulated onto the p assigned carriers, resulting in p data signals representing the modulated carriers, respectively. In addition, controller 212 transmits control messages described below, through link 214, to modulator bank 206 where a modulator modulates the control messages onto the aforementioned control carrier, resulting in a control signal representing the modulated control carrier.

Combiner 208 combines the p data signals and control signal to form a combined signal, which is fed to optical transceiver 210. The latter generates an optical signal representing the combined signal. The optical signal traverses optical fiber 213 to fiber node 178. A transceiver (not shown) in fiber node 178 which performs the inverse function to transceiver 210 converts the optical signal back to the combined signal in electrical form. The combined signal traverses cable distribution network 180 to service area node 182, where the combined signal is multicast to set-top terminals 106-1 through 106-n. A set-top terminal may tune to the control carrier frequency CCF and extract the control signal from the received combined signal. The control signal may contain information identifying the carrier which is assigned to carry the program channel material selected by the set-top terminal. Based on any such information, the set-top terminal tunes to the frequency of the identified carrier and extracts the corresponding data signal from the received combined signal. The selected program channel material is then derived in a well-known manner from the extracted data signal for viewing.

Figure 4:
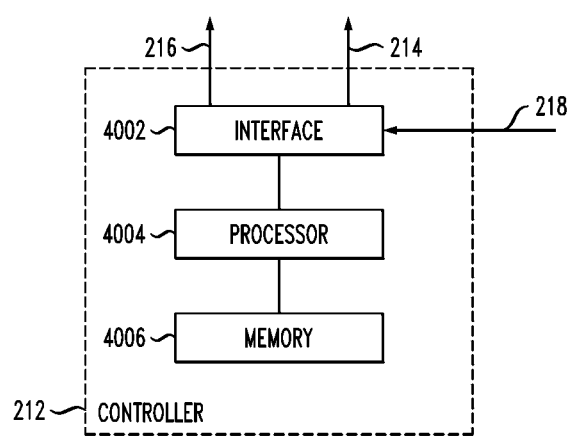
FIG. 4 is a block diagram of a controller used in the system of FIG. 2.

Referring to FIG. 4, controller 212 includes processor 4004 of conventional design, which is connected to memory 4006 and interface 4002. In accordance with the Brooks invention, processor 4004 receives, from one or more of set-top terminals 106-1 through 106-n, requests for materials of program channels selected thereby. Such requests are processed by processor 4004 in accordance with routines stored in memory 4006 which are described below. It suffices to know for now that in response to one such request, processor 4004 causes switching unit 204 to switch the program data stream corresponding to the requested program channel to a selected input of modulator bank 206 and assigns an unused carrier for transmitting the data stream if processor 4004 has not done so. In addition, processor 4004 transmits a control message receivable by the requesting set-top terminal, which includes the information identifying the carrier assigned by processor 4004 to carry the requested program channel material. As mentioned before, based on such information, the requesting set-top terminal tunes to the frequency of the identified carrier to obtain the selected program channel material.

Figures 5, 6:
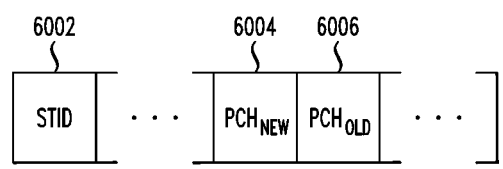
FIG. 5 is a table used by the controller for dynamically assigning the carriers for transmission of program materials.
FIG. 6 illustrates a data format of a request processed by the controller.

To manage the dynamic assignment of carriers for transmitting requested program channel materials to each neighborhood, an assignment table is used in this instance which is stored in memory 4006. FIG. 5 illustrates such an assignment table (denoted 5000), which includes columns 5004, 5006 and 5008. Column 5004 enumerates each program channel X selectable by a subscriber through a set-top terminal, which ranges from 1 to K in this instance. Column 5006 tracks, for each program channel X, the number of subscribers in the neighborhood who have selected that program channel to watch ($N_{PCHX}$). Column 5008 includes entries identifying the carriers assigned by processor 5004 to carry the respective materials of program channels X. Thus, with assignment table 5000, processor 4004 has knowledge that, for example, referring to row 5011, carrier $C_3$ (one of the carriers $C_1$ through $C_M$) is assigned for program channel 2 (X=2) which 12 subscribers ($N_{PCHX}$=12) have selected to watch. In addition, as indicated in row 5013, no subscriber ($N_{PCHX}$=0) has selected to watch program channel 1 (X=1). Thus, in accordance with the Brooks invention, no carrier (Null) is assigned for program channel 1. That is, program channel 1 material is currently not transmitted to service area node 182 and thus not currently made available in the neighborhood.

When a subscriber at a set-top terminal selects a different program channel to watch, a request for material of the newly-selected program channel is sent from the set-top terminal to controller 212, as shown at 218. It should be noted at this point that each of set-top terminals 106-1 through 106-n is preassigned with an identifier for identifying the set-top terminal. FIG. 6 illustrates the request which includes, inter alia, STID field 6002 containing an identifier identifying the requesting set-top terminal, $PCH_{NEW}$ field 6004 containing the newly-selected program channel number, and $PCH_{OLD}$ field 6006 containing the previously-selected program channel number. Thus, for example, if the subscriber changes the program channel selection from channel 8 to channel 2 (or in other words "deselects" channel 8 in favor of channel 2), the value of $PCH_{NEW}$ field 6004 would be set to "8" and that of $PCH_{OLD}$ field 6006 would be set to "2." If the subscriber has just turned on the cable TV to watch program channel 9, the value of $PCH_{NEW}$ field 6004 in that instance would be set to "9" and that of $PCH_{OLD}$ field 6006 would be set to "0." indicating an off state. Conversely, if the subscriber who has been watching program channel 9 chooses to turn off the cable TV, the value of $PCH_{NEW}$ field 6004 would be set to "0" and that of $PCH_{OLD}$ field 6006 would be set to "9."

Referring back to FIG. 2, the above-described request is generated by the requesting set-top terminal, say, terminal 106-1, which incorporates a cable modem for modulating a specified carrier in a reverse passband with the request data. As is well known, in the United States the reverse passband, which ranges from 5 MHz to 42 MHz, is allocated for transmission of signals from set-top terminals to a head end to realize interactive services. e.g., the inventive cable TV service of Brooks. The modulated signal from terminal 106-1 representing the request data is fed to service area node 182, from where it is forwarded to fiber node 178 through cable distribution network 180. In fiber node 178, the aforementioned optical transceiver (not shown) generates an optical signal representing the modulated signal. The optical signal traverses optical fiber 215 to optical transceiver 210 in head end 150. Optical transceiver 210 converts the optical signal back to the modulated signal in electrical form. The modulated signal is then demodulated by demodulator 230 to recover the original request, which is fed to controller 212 through link 218. In response to the received request, controller 212 invokes a first routine stored in memory 4006.

Figure 7:
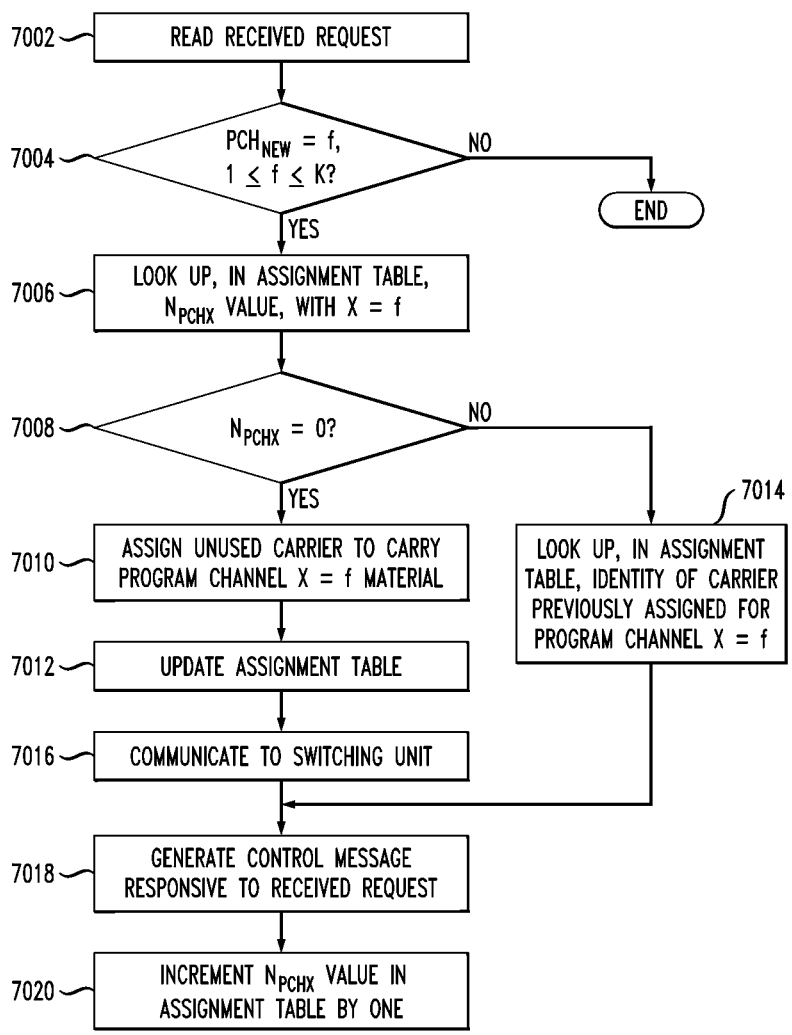
FIG. 7 is a flow chart illustrating a process for processing the request.

Instructed by the first routine, processor 4004 reads the received request, as indicated at step 7002 in FIG. 7. At step 7004, processor 4004 determines whether $PCH_{NEW}$ field 6004 in the request has a nonzero value f, $1 \leq f \leq K$. If not, i.e., the $PCH_{NEW}$ field value is equal to "0" indicating that the subscriber's cable TV has been turned off, the routine comes to an end. Otherwise, processor 4004 at step 7006 looks up, in assignment table 5000, the value of $N_{PCHX}$ with X=f in this case. At step 7008, processor 4004 determines whether the $N_{PCHX}$ value just looked up equals 0. If $N_{PCHX}$=0, analogous to the previously described situation with respect to row 5013 of table 5000, no carrier has been assigned to carry the requested program channel material to service area node 182. That is, the requested program material is currently not made available to the neighborhood. In that case, processor 4004 at step 7010 assigns an unused carrier to carry the requested material of program channel X=f. The new carrier may be selected to avoid as much as possible noise and interference with other carriers being used to optimize the cable TV quality. At step 7012, processor 4004 updates assignment table 5000 to include the identity of the carrier assigned for program channel X=f. Processor 4004 at step 7016 communicates to switching unit 204, directing it to switch the program data stream associated with program channel X=f to the proper input of modulator bank 206 such that the program channel material is modulated onto the newly-assigned carrier. At step 7018, processor 4004 generates a control message responsive to the received request, which is to be read by the requesting set-top terminal, terminal 106-1 in this instance. The control message includes, among other information, the STID from the request identifying terminal 106-1 which is the intended recipient of the message, and the identity of the assigned carrier carrying the requested program channel material. The control message is transmitted through the control channel in a manner described before and multicast from service area node 182 to the set-top terminals in the neighborhood. In particular, terminal 106-1 is tuned to the control channel and reads the STID information in the control message, which identifies terminal 106-1 in this instance. Recognizing that it is the intended recipient of the message, terminal 106-1 goes on to read other information in the message including the identity of the assigned carrier carrying its selected program channel material. With the knowledge of the assigned carrier's identity, terminal 106-1 tunes to the frequency of the assigned carrier to receive the selected program channel material.

In any event, the routine proceeds from step 7018 to step 7020 where processor 4004 increments the value of $N_{PCHX}$ with X=f in assignment table 5000 by one, reflecting the fact that an additional subscriber (or set-top terminal) in the neighborhood has selected program channel X=f to view. Referring back to step 7008, if processor 4004 determines that the value of $N_{PCHX}$ with X=f does not equal 0, i.e., at least one set top terminal currently receiving program channel X material carried by a previously assigned carrier, the routine proceeds to step 7014. Processor 4004 at step 7014 looks up, in assignment table 5000, the identity of the carrier previously assigned for program channel X=f. The routine then proceeds to step 7018 described before.

Figure 8:
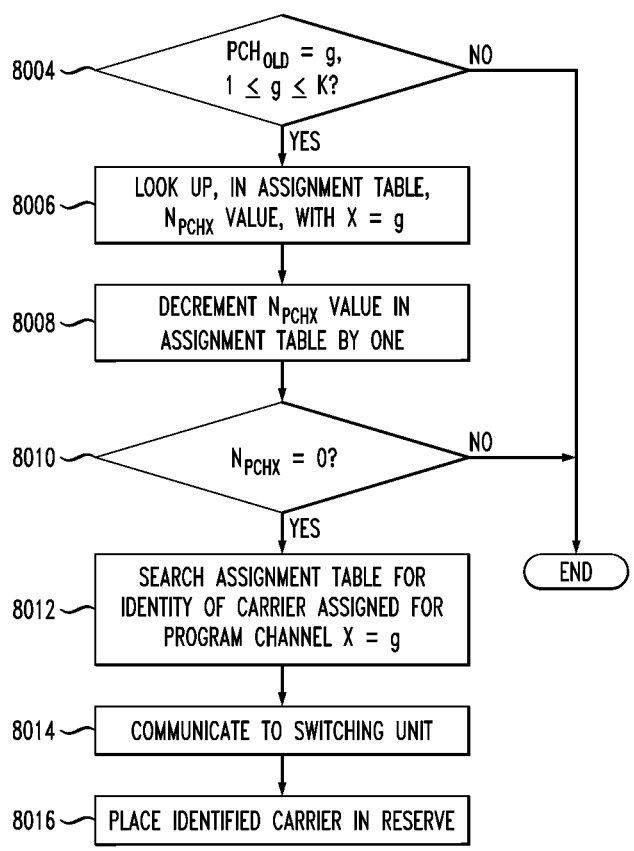
FIG. 8 is a flow chart illustrating a process for retiring an unused carrier.

Reference should now be had to FIG. 8. After the first routine is completed, a second routine is preferably invoked to perform a garbage collection function for retiring any carrier carrying program material which is no longer selected by any set-top terminal in the neighborhood. Instructed by this second routine, processor 4004 at step 8004 determines whether $PCH_{OLD}$ field 6006 in the received request has a nonzero value g, $1 \leq g \leq K$. If not, i.e. the $PCH_{OLD}$ field value equal to "0" indicating that the subscriber's cable TV has just been turned on, the second routine comes to an end. Otherwise, processor 4004 at step 8006 looks up, in assignment table 5000, the value of $N_{PCHX}$ with X=g in this case. At step 8008, processor 4004 decrements the $N_{PCHX}$ value just looked up by one, reflecting the fact that one fewer subscriber (or set-top terminal) in the neighborhood selected program channel X=g to view. Processor 4004 at step 8010 determines whether the resulting $N_{PCHX}$ value equals 0. If not, the second routine comes to an end. Otherwise, if $N_{PCHX}$=0, i.e., program channel X=g no longer selected by any subscriber (or set-top terminal) in the neighborhood, the second routine proceeds to step 8012. Processor 4004 at step 8012 searches assignment table 5000 for the identity of the carrier assigned for program channel X=g. Processor 4004 at step 8014 communicates to switching unit 204, causing unit 204 to stop switching the program data stream corresponding to program channel X=g to modulator bank 206, thereby terminating the transmission of the program data stream otherwise carried by the identified carrier. Processor 4004 at step 8016 places the identified carrier in reserve by substituting the carrier identity entry with "Null" in assignment table 5000.

In some instances, the system in FIG. 2 may be used to serve multiple neighborhoods. Furthermore, in some cases, the system of FIG. 2 can readily accommodate what is known in the art as a picture-in-picture (PIP) feature providing simultaneous viewing of multiple program channels. In that case, a set-top terminal supporting the PIP feature requests materials of multiple program channels and simultaneously tunes to the assigned carriers carrying the requested program materials.

In the event that the carriers in the CATV system of FIG. 2 are oversubscribed, i.e., no available carrier can be assigned by controller 212 to carry new program material requested by a set-top terminal in the neighborhood, "blocking" may be implemented such that the requesting set-top terminal is temporarily denied access to the new program material. However, the requesting set-top terminal may be instructed by controller 212 to tune in the meantime to a pre-set channel reserved for the blocking purposes. For example, this pre-set channel may carry commercials, infomercials, coming movie attractions. etc. in addition to a stand-by notice informing the subscriber of the unavailability of the requested program material. Alternatively, controller 212 may transmit a text message including the stand-by notice to the requesting set-top terminal to be shown to the subscriber. In either event, as soon as a carrier becomes available, controller 212 transmits another notice to the requesting set-top terminal to inform the subscriber of the availability of the requested program material, followed by a control message identifying the carrier newly assigned to carry such material. In response to this control message, the set-top terminal tunes to the frequency of the identified carrier to obtain the requested program material.

Moreover, the request of FIG. 6 may automatically be generated by a set-top terminal to deselect a program channel as soon as an event on the program channel such as a movie is over. For example, by setting a time-out clock in the head end or set top terminal to track the play time of the event, the request, with $PCH_{NEW}=0$, is transmitted as soon as the time-out period corresponding to the length of the event or a fixed time expires. If no other set-top terminals in the same neighborhood tune to the frequency of the carrier assigned for the program channel, the assigned carrier will be retired in accordance with the Brooks invention. Thus, at an event boundary, a program channel may be deselected based on a fixed or variable time-out period.

In some cases, if a request cannot be granted to a requesting set top terminal, due to inadequate bandwidth, a search can be carried out for one or more sessions that can be shut down to free up bandwidth; in at least some instances, based on a suitable time-out period (e.g., four hours).

The request for deselecting a program channel may also be automatically generated by a set-top terminal in response to a lack of an audience. For example, the set-top terminal may incorporate detection technologies such as motion detectors, acoustic sensors and/or infrared sensors, which are used to detect presence of any viewers in front of the set-top terminal by their movement, voice and/or body heat. If it is determined that no viewer is present, the request for deselecting the program channel is automatically generated by the set-top terminal.

Figure 9:
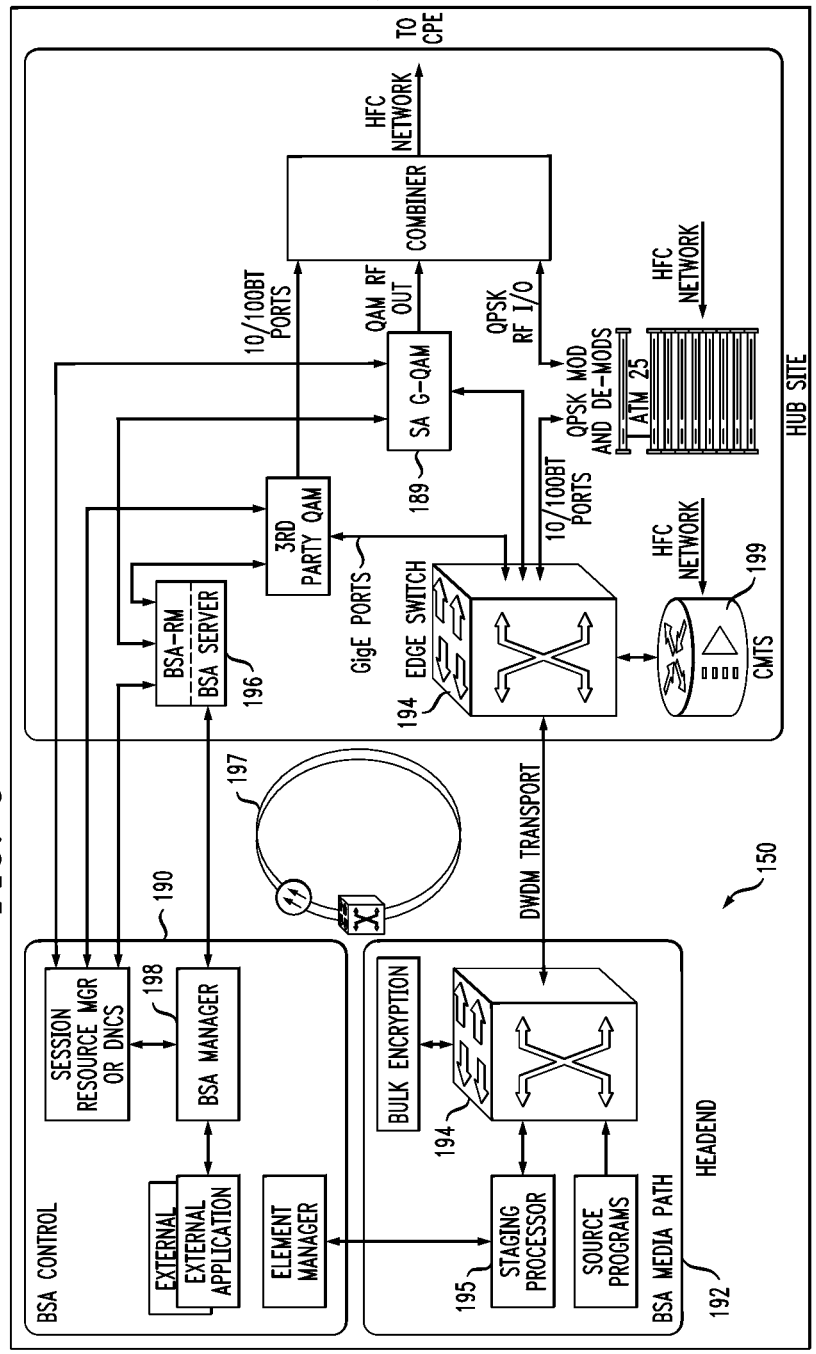
FIG. 9 is a functional block diagram illustrating one exemplary broadcast switched architecture (BSA) network useful with one or more embodiments of the present invention.

FIG. 9 illustrates another exemplary "switched" network architecture also useful with one or more embodiments of the present invention. A so-called "broadcast switched architecture" or BSA network is illustrated in this exemplary embodiment.

Switching architectures allow improved efficiency of bandwidth use for ordinary digital broadcast programs. Ideally, the subscriber will be unaware of any difference between programs delivered using a switched network and ordinary streaming broadcast delivery.

FIG. 9 shows the implementation details of one exemplary embodiment of this broadcast switched network architecture. Specifically, the head-end 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

With respect to FIG. 9, note that in some current head ends (e.g., those using technology from Motorola, Inc., Schaumburg, Ill. USA) there is no explicit GSRM or digital network control system (DNCS); rather. VOD vendors implement required functionality in their own proprietary way. In other head end configurations, such as in those implemented by Time Warner Cable, Inc., New York, N.Y., USA, GSRM functionality, as described herein, can be employed. Accordingly, it should be understood that the embodiments herein are exemplary and non-limiting, and one or more embodiments of the invention can be implemented with a variety of different devices that are used to carry out appropriate functionality. For example, a session resource manager apparatus could be implemented in many different ways, and is not limited to the specific GSRM/SRM examples shown in the figures.

In addition to "broadcast" content (e.g. video programming), the systems of FIGS. 1-9 may also deliver Internet data services using the Internet protocol (IP), although other protocols and transport mechanisms of the type well known in the digital communication art may be substituted. One exemplary delivery paradigm comprises delivering MPEG-based video content, with the video transported to user personal computers (PCs) (or IP-based set-top boxes (STBs)) over DOCSIS channels comprising MPEG (or other video codec such as H.264 or AVC) over IP over MPEG. That is, the higher layer MPEG or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 9, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Note also that edge switch 194 in block 150 in FIG. 9 can, in the most general case, be the same or different as that shown in the hub site of FIG. 9. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs 106. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while some descriptions presented herein are described in the context of Internet services that include multicast and unicast data, there is potential applicability to other types of services that include multicast transmission of data delivered over a network having multiple physical channels or even virtual or logical channels. For example, switching between various physical channels that comprise a virtual channel, can itself be conducted according to the "switched" approach. As a simple illustration, if a first virtual channel is comprised of physical channels (e.g., QAMs) A, B and D, and a second virtual channel is comprised of QAMs C, E and F, a cable modem (CM) or other CPE can be configured to switch between the A/B/D and C/E/F virtual channels as if they were a single QAM.

The configurations shown in FIGS. 1-9 are exemplary in nature and different approaches may be used in other embodiments; such other approaches may have more or less functionality (for example, high speed Internet data services might be omitted in some cases).

Figure 10:
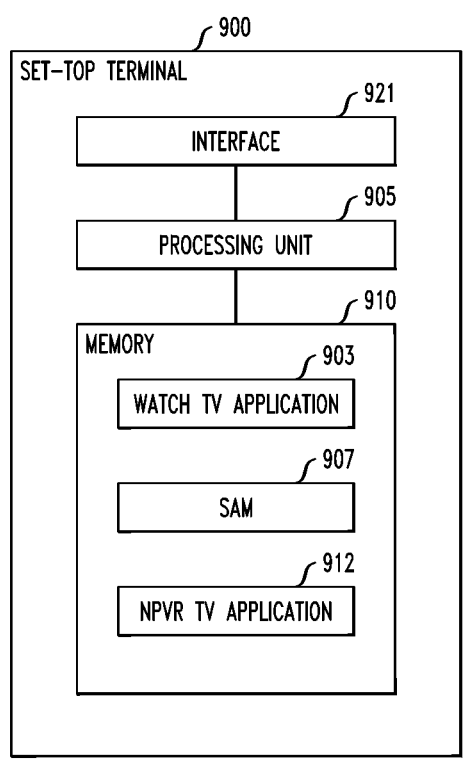
FIG. 10 is a block diagram of a set-top terminal.

FIG. 10 shows an example of a set-top terminal 900, which is one form of CPE 106. A conventional "Watch TV" application (denoted 903 in FIG. 10) is installed in the set-top terminal (denoted 900) to service those program channels (or programs) afforded the traditional broadcast service. Watch TV application 903, residing in memory 910, provides such well known functions as channel navigation control, channel selection in response to a channel change event, etc. A channel change event occurs when a user at set-top terminal 900 issues a command to change from one program channel to another. Such a command may be issued, say, using a remote control (not shown), which signal is receptive by set-top terminal 900. Memory 910 in this instance comprises one or more caches, disks, hard drives, non-volatile random access memories (NVRAMs), dynamic random access memories (DRAMs), read-only memories (ROMs), and/or Flash ROMs.

For example, in memory 910, NVRAM may be used for storage of a user's settings and set-top terminal configuration settings, such as parental control codes, favorite channel lineups, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression. DOLBY DIGITAL® (registered mark of Dolby Laboratories Licensing Corporation, San Francisco, Calif.) Adaptive Transfer Coding 3 (AC-3) audio decoding, and video manipulation. ROM may be used for storage of the operating system. Flash ROM may be used for storage of resident application software, as well as patches of the operating system and application software, which software and/or patches are downloaded to set-top terminal 900 from head-end 150 after set-top terminal 900 has been deployed at the user's premises.

Processing unit 905 orchestrates the operations of set-top terminal 900. It executes instructions stored in memory 910 under the control of the operating system. Service application manager (SAM) 907 forms part of such an operating system of terminal 900. SAM 907 is responsible for, among other things, monitoring channel change events; administering channel, service and other tables in terminal 900; and maintaining a registry of applications in terminal 900. One such application is the aforementioned Watch TV application 903 which is invoked to service a traditional broadcast channel (or program). Another potential application is a so-called "NPVR TV" application 912 which is invoked to service NPVR (network personal video recorder) enabled channels (or programs), and which may be downloaded from head-end 150 to memory 910. Application 912, among other things, emulates the functionality of a personal video recorder by responding to rewind, pause and fast-forward commands initiated by a user, and communicating such commands to head-end 150 through interface 921 to perform the trick mode (i.e. rewind, pause and fast-forward) functions on programs. In addition, for example, application 912 not only allows a user to reserve future broadcast programs for review, but also reserve, play or restart programming content that has broadcast. Interface 921 allows receipt of in-band and out-of-band material from head end 150, as well as sending communications to the head end via a reverse data channel (for example, of the kind(s) discussed above).

Figure 11:
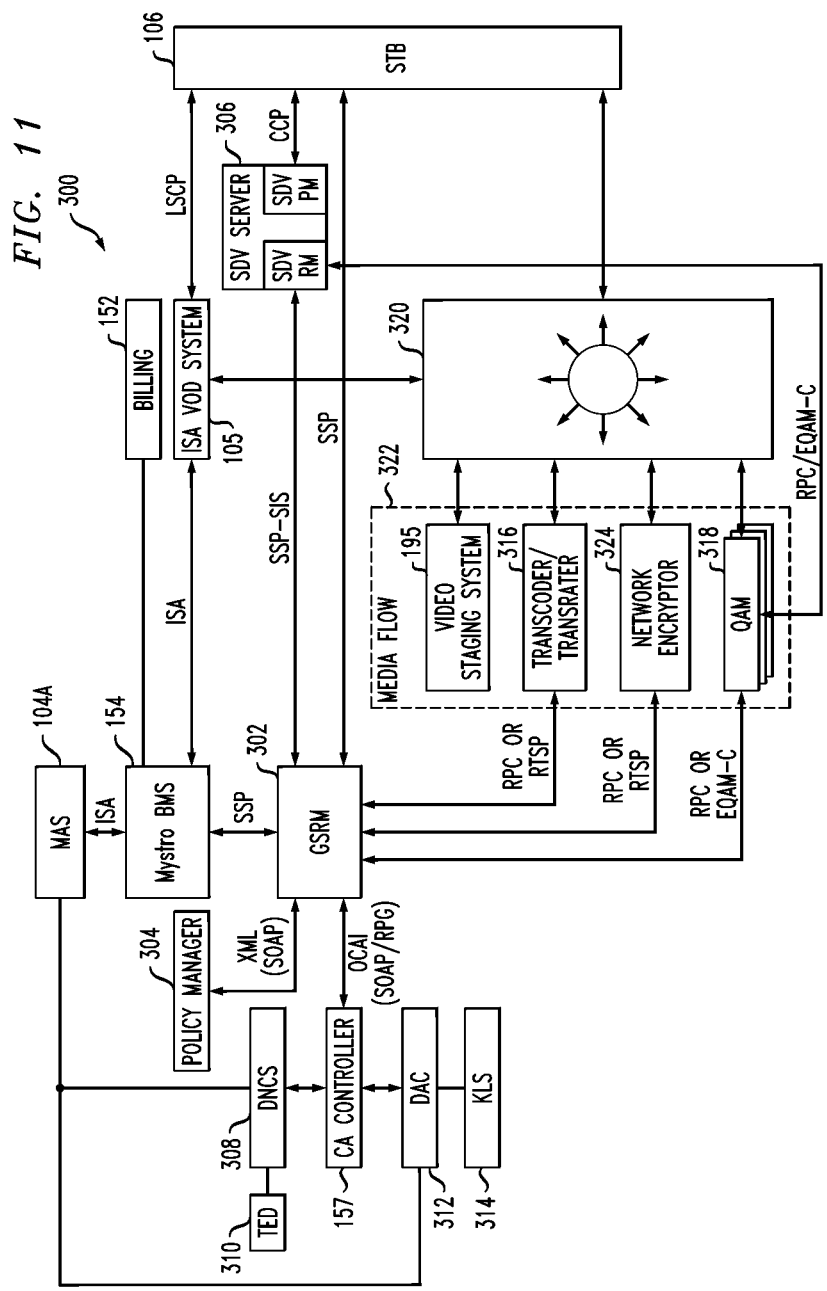
FIG. 11 is a functional block diagram of a video content network with a session resource manager.

One or more embodiments employ session resource management (SRM) functionality to manage video-on-demand and/or switched digital sessions. Preferably, the SRM provides an element that is compatible across a number of head end platforms, such as Motorola. OpenCable. Overlay (SA/Moto) and Scientific-Atlanta (SA). One exemplary embodiment of an SRM is a global session resource manager (GSRM). FIG. 11 shows an exemplary GSRM environment 300, which encompasses an interface to an external policy manager, switched digital video support, and third party entitlement control message generator (ECMG) interfaces. An additional goal is to maintain and reuse currently available interfaces and protocols. Interfaces into an external policy manager may be implemented, for example, via a static XML interface or a dynamic SOAP/XML interface.

GSRM 302 interfaces with conditional access controller 157, which in turn interfaces with digital network control system 308 and TED (transactional encryption device) 310 as well as digital access control system 312 and KLS (key list server) 314. Such interface may employ, for example, open conditional access interface (OCAI) such as SOAP/RPC (remote procedure call). GSRM 302 may also interface with an external policy manager 304, using, for example, extensible markup language (XML(SOAP)) as described in greater detail below. The skilled artisan will appreciate that "SOAP" stands for Simple Object Access Protocol. Also, DNCS 308 may carry out management and CPE configuration analogous to block 308 in FIG. 1A.

Note that a TED is typically present in a system from Cisco Systems, Inc., San Jose, Calif. USA, or a system from Scientific Atlanta (now also part of Cisco Systems. Inc.), and manages the cryptographic keys while the KLS performs analogous functions in systems from Motorola. Inc. of Schaumburg, Ill., USA. These are non-limiting examples of general functionality for managing cryptographic keys. Thus, elements 308, 310 are generally representative of systems from Scientific Atlanta while elements 312, 314 are generally representative of Motorola systems.

Furthermore, the GSRM may interface (for example, using session setup protocol, SSP) with a business management system, such as the Time Warner Cable MYSTRO business management system (BMS) 154. BMS 154 is in turn coupled to billing block 152. The business management system may in turn interface with an application server 104A, such as a Time Warner Cable MYSTRO application server, using, for example, interactive services architecture (ISA). The BMS 154 may also interface with a suitable VOD server 105, such as an ISA VOD system, again, using, for example, ISA.

Yet further. GSRM 302 may interface with a suitable media flow block 322, which may include a video staging system 195, a transcoder and/or transrater 316, a network encryptor 324, and a number of QAMs 318. Communication with block 316 may be, for example, via a suitable transcoder control interface, providing an interface from the GSRM to a transcoder or trans-rater to carry out MPEG manipulation, re-encoding, and the like; communication with block 162 may be, for example, via remote procedure call (RPC) or a suitable network encrypter control interface from GSRM to network encrypter 324; and communication with the QAMs may be, for example, via RPC or edge QAM-C (EQUAM-C). Note that in FIG. 1A, encryption 324 and modulation 318 are combined in block 162. Element 320 is a router.

MAS 104A may be coupled to DNCS 308 or digital access control system 312 as the case may be.

The skilled artisan will appreciate that a messaging interface from the GSRM to a transcoder or trans-rater device, or to a network encrypter, can be implemented, for example, using RPC (remote procedure call) or RTSP (real time streaming protocol) messaging to outline the characteristics of the desired code, rate, or encryption parameters. A transcoder might, for example, convert from MPEG-2 to MPEG-4, in the case where an end client supports MPEG-4. In the case of a trans-rater or statistical multiplexer type of device, the goal is to fit more video programs into a QAM, so the programs are statistically multiplexed together "on-the-fly."

A suitable switched digital video server 306 may also be provided, including SDV RM (switched digital video resource manager to manage resources assigned to the SDV system) and SDV PM (switched digital video policy manager) functionality (not separately numbered). Communication between GSRM 302 and server 306 may be implemented, for example, using session setup protocol server initiated session (SSP-SIS). Server 306 may communicate with QAMs 318 via RPC or EQUAM-C. A set top terminal or box (STB) 106 may communicate with VOD server 105 via, for example, lightweight stream control protocol (LSCP); with SDV server 306 via, for example, channel change protocol (CCP); and with GSRM 302 via, for example, session setup protocol (SSP).

Figure 12:
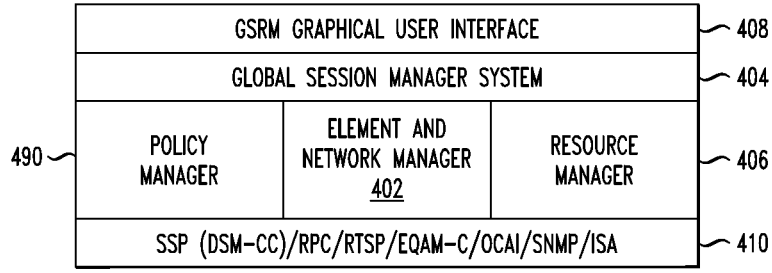
FIG. 12 shows exemplary components of a session resource manager.

As shown in FIG. 12, the SRM 302 encompasses three major functions, namely, element and network manager 402, session manager 404, and policy manager 490. In the first function, the element manager 402 provides provisioning and configuration information for the edge devices (e.g., edge QAMS 318) and network encrypter 324. The second function 404 handles the assignment of network and RF resources for devices generating session requests. Additionally, the SRM 302 needs access, via a secure interface, to the conditional access (CA) system 157 to provide for content security. The third function, policy manager 490, provides the ability to allocate these resources based on pre-determined and real time policies as related to the type of asset and/or program requesting bandwidth from the network, in addition to predetermined techniques that can be used when such policies do not apply. The internal policy manager 490 receives rule-sets via an XML file and/or supports a SOAP/XML interface for real time policy decisions.

In some instances, the SRM functionality resides physically on the VOD server 105, while in other cases it is split between two entities, the VOD server 105 and a session resource manager of the DNCS 308.

The Element and Network Manager component 402 is responsible for a number of functions. Listed below is an overview of the primary components;

A provisioning system for edge devices, video servers, switched digital video servers, network encrypter, network elements, switches, and the like.

Monitoring of various network components to provide SRM engine ability to make session decisions based on available resources.

Managing entitlement messages and conditional access keys, when applicable.

Ability to provide a graphical representation of network components and related interconnects, including setting under/over-provisioning of interconnects.

Ability to provide a graphical interface 408 for designing and managing the network topology and interfaces.

The network manager preferably constantly monitors network usage and reports congestion, failures, downed links, and the like. A significant aspect of the network manager is to provide high (for example, 99.99%) uptime of the network for the delivery of video services. In addition, the network manager is preferably able to proactively provide alternate links (when available) to traffic to minimize service interruptions and stream/session failures.

In a preferred embodiment, to provide the operator with suitable monitoring capabilities, the network manager provides the ability to show the current network utilization of any device and interconnect links. The information is preferably provided in a graphical manner to the operator and highlights any troublesome or failed devices or connections (for example, using the graphical user interface (GUI) 408. A layer representing the various communications protocols is shown at 410.

Figure 13:
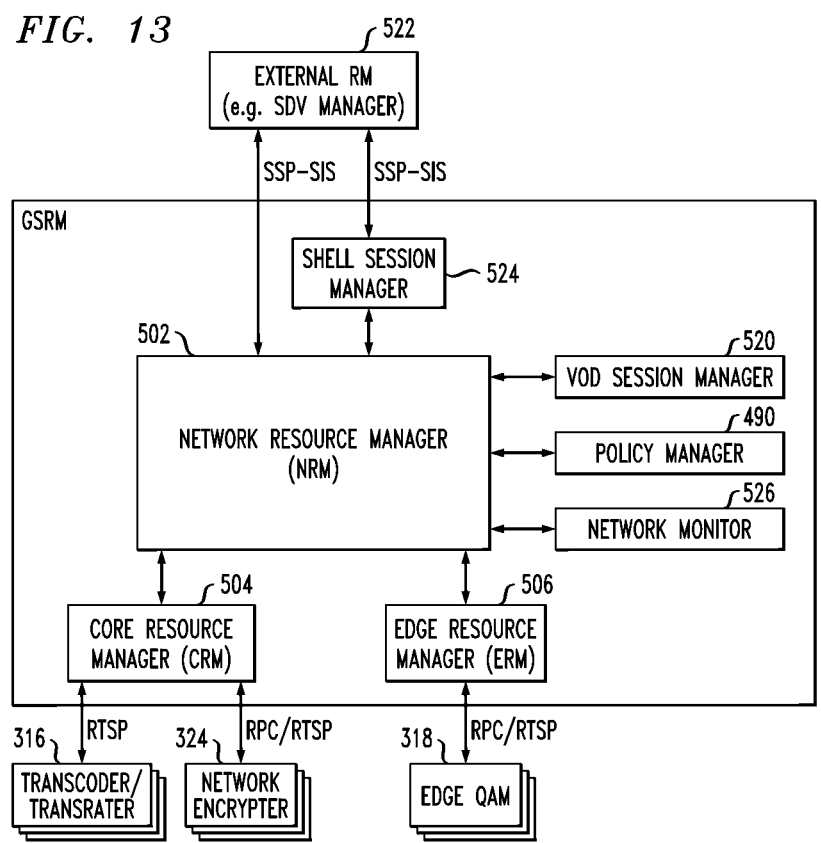
FIG. 13 shows additional details of an exemplary session resource manager in its environment.

As shown in FIG. 13, resource manager 406 of FIG. 12 preferably includes network resource manager (NRM) 502, core resource manager (CRM) 504, and edge resource manager (ERM) 506. The NRM 502 is responsible for receiving resource requests from the session managers (VOD 520, SDV 522. Shell 524, and so on). After the NRM receives the request, it will then look at what is needed to service the request (encryption, bandwidth, and the like) and then make the requests from the core and edge resource managers 504, 506. The NRM 502 needs to be aware of all of the network (core and edge) resources and their state, so it can make session resource decisions. For instance, if an edge device does not support encryption and the session needs to be encrypted, then the NRM must use the appropriate core encryption device to encrypt the session. Functionally, the NRM, CRM and ERM may be bundled as one process and/or component, or as separate processes and/or components. Note that RTSP stands for real-time streaming protocol. The network monitoring functionality is shown at 526.

With regard to policy manager 490, in one or more embodiments, with business rules manager enabled, session allocation and most network resources can be assigned based on a pre-defined set of business rules. For example, a high-definition (HD) VOD session may be given preference over a free on-demand session. While this is one example, the system is preferably modular, extensible and configurable to allow operators to set the parameters of the business rules engine.

It is also preferred that an operator can determine rules and parameters for the loading of network elements and connections. Instead of purely looking at business rules, new techniques and static configurations may be used for allocating resources on a per-stream and/or per-session or product basis. Some versions of the policy manager (PM) 490 inside the GSRM may allow for XML import of static policy rule sets. Preferably, the GSRM provides a GUI 408 for setting the policies and modifying them. The PM 490 may also support a dynamic policy interface via SOAP/XML to an external policy manager system 304.

A significant function of the session manager (SM) 404 is to provide the mechanism for session requests to receive the proper conduit for the delivery of video. The primary responsibility of the SM is for handling DSM-CC session requests from a VOD client residing on a client device (e.g. STB, and the like). Each time a session is created, the SM must communicate with policy manager 490 and resource manager 406 to determine the best route for the session to be streamed and also determine if, where, and how the session will be set up based on the system policies. Additionally, the GSRM will provide the application server 104 with the appropriate information to determine the type of stream to be created (e.g. MPEG-4 Advanced Video Codec (AVC)) and conditional access method. Non-limiting examples of conditional access methods include the Cisco PowerKEY® conditional access system (registered mark of Cisco Systems, Inc., San Jose, Calif., USA) for a set-top box or the Motorola MediaCipher™ system (mark of Motorola, Inc. of Schaumburg, Ill., USA).

The session manager also works in a split model with SDV manager 522 to receive session requests (pre-provisioned/shell or exclusive/provision) for allocating network resources for this request. It is the responsibility of the GSRM to provide a shell session manager to track and manage shell session requests from an external session manager. The shell session manager should maintain a list of granted shell sessions, even through a reboot, power outage, etc. Additionally, the shell session manager should provide reconciliation tools for the external session manager (e.g. SDV server 306) and query tools for status checking with QAMs.

Figure 14:
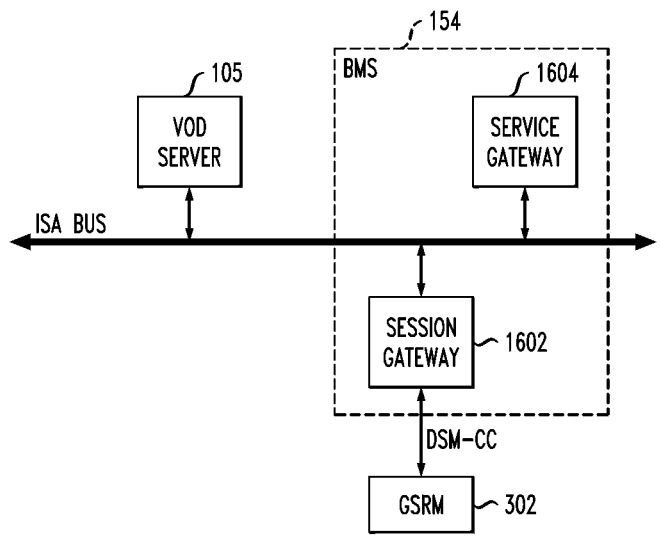
FIG. 14 shows a session manager to session gateway component.

As seen in FIG. 14, in some instances, a session gateway process 1602 resides on the BMS 154 and serves as the entry point for session messaging from DSM-CC to ISA. The GSRM 302 forwards all VOD session communication along to the session gateway and the BMS in turn forwards it to the service gateway 1604. FIG. 14 outlines an exemplary interface structure of the session gateway process residing in the BMS.

Figure 15:
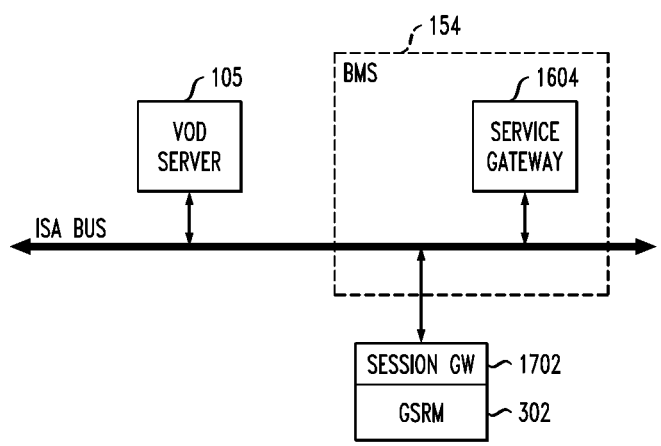
FIG. 15 shows a session manager to service gateway component.

Reference should now be had to FIG. 15. In some instances, the GSRM and ISA VOD infrastructure may gain certain efficiencies in session setup speed and reliability by moving the session gateway process 1602 onto the GSRM, as shown at 1702 in FIG. 15. The GSRM would then communicate directly to the service gateway 1604 on the ISA bus. Inasmuch as part of the client session request is a descriptor for the service gateway, the GSRM would use this descriptor to pass the appropriate session request information to the referenced service gateway.

The ISA bus is primarily directed towards using Common Object Request Broker Architecture (CORBA) for messaging the ISA interfaces. Direct communication of the GSRM to the service gateway would require the GSRM to implement the appropriate ISA and CORBA interfaces. Other alternatives to the CORBA interface include SOAP/XML.

It is preferred that a variety of different interfaces be supported by GSRM and the related components and processes, so as to permit interface with hardware and software from many manufacturers, such as Motorola, Scientific-Atlanta and Overlay (Moto/SA) systems. The aforementioned SSP reflects an implementation of the ISO/IEC 13818 MPEG-2 DSMCC specification, incorporated herein by reference in its entirety for all purposes.

The SRM 302 manages a pool of HFC and network resources across many edge devices (e.g. edge QAMS 318) and reaching multiple service groups. Note that core devices may include, for example, network encrypters, transcoders, statistical multiplexers, and the like. For the setup of a particular session, the SRM allocates resources from the aforementioned pool. The qualified resources are determined by the service group specified by the STB 106. A mechanism that indicates that an edge device has been removed from service, and thereby its resources must be removed from the allocation pool, is provided in one or more embodiments. The element manager 402 configures the edge device with static configuration information such as modulation mode, transport ID (frequency), as well as provisioning the MPEG-2 multi-program transport stream. This information must be communicated to the SRM so that is can be transmitted to the STB along with session specific information during session set-up.

Service applications and clients communicate to the SRM using the session setup protocol, an implementation of DSM-CC. Certain parameters such as retransmission rate for the messages are not defined within the specification. These must be defined or left as configurable parameters for the SRM. In some instances, these messages are actually passed through the session gateway to provide a distributed object interface for the sessions.

In SSP, the client 106 sends a client session request to the GSRM 302 to begin the session establishment. This request contains information for identifying the service group as well as information pertinent to the server application. The GSRM verifies the message integrity and passes it along to the server with which the session is desired (e.g. VOD server 105. BMS 152, 154, application server 104, SDV server 306). The server makes a server add resource request to the SRM, including the amount of downstream bandwidth. MPEG Program and server conditional access. Also included is the Ethernet descriptor if the application desires to indicate a preference. In another aspect, the "server add resource" request may include only a source parameter, allowing the GSRM 302 to respond with the appropriate resources.

The SM will determine resource availability after consulting with the resource manager 406 and policy manager 490. If the resources are available, the GSRM 302 will allocate the appropriate resources and signal an indication of success back to the server. If the system requires encryption, the GSRM 404 will send a suitable request for same to the DNCS CA Manager (CAM) 157. If the requested resources are available, the CAM will reply with a confirmation. The GSRM 302 then will send the appropriate CA credentials to the client and encryption device.

At this point, the server provides a response in which the IP address of the service entry point is specified. In case of failure, the GSRM adds the resources back to the pool. The GSRM uses the HFC resources allocated from the pool to construct a confirmation including modulation mode, transport ID, bandwidth, client conditional access and service entry IP address. The SRM handles a client release request message to allow the client to abort in progress session setups. Once the session has been created, the application server 104. SDV server 306, and/or VOD System 105 will create the appropriate stream for the client.

The GSRM's role as the "global" resource manager places it in the position to manage, monitor and control the network (incl. HFC) resources for sessions. To provide a robust QAM sharing ability, the GSRM should be the central arbiter between VOD and SDV sessions. SDV Server 306 will reside external to the GSRM server and will utilize the SSP-SIS extensions to request session bandwidth. The SDV server may request this bandwidth using one of a few methods:

Shell session (pre-provision)
Exclusive session (shell or RM provisioned)
Combination of shell and exclusive The GSRM is preferably agile enough to handle all these modes simultaneously from an external SDV system 306.

Since Network Resources become more valuable and scarce with each session request from clients and servers, the GSRM preferably provides a method for arbitrating these requests. The GSRM sets session thresholds based on product type for VOD (e.g., free on demand (FOD), movies on demand (MOD), subscription video on demand (SVOD), etc.) and switched digital video (SDV). The MSO can define the name of the product and amount of allowable sessions per service group. In addition, the system provides a way to proactively request session resources back from a client and/or SDV manager. A ceiling can be prescribed by product and/or service and when the ceiling is exceeded requests and/or teardowns could be done on the least preferable sessions (for instance. FOD). The described functionality provides a level of policy control on the sessions being allocated by the GSRM. The GSRM preferably provides the ability to easily support an external policy manager 304 via a SOAP/XML interface that provides extended capabilities.

The Session Resource Manager functionality may reside on a single component such as a VOD server or may be spread across multiple components. In one or more embodiments, the Session Resource Manager (SRM) is the central mechanism for aligning head end resources to establish a peer-to-peer connection between the video server and the end user's set-top box (STB). A sub-component of the SRM is the actual bandwidth allocation technique. With the addition of High Definition Video-On-Demand to the current offering of Standard Definition Video-On-Demand, appropriate techniques should be employed to support the commingling of High Definition Video-On-Demand (HDVOD) and Standard Definition Video-On-Demand (SDVOD) content and the establishment of Quality of Service (QoS) guarantees between the two different services.

The narrowcast bandwidth of the VOD service group is arguably the most expensive bandwidth within the cable system. Video server streams, transport, switching fabric, QAMs, RF-combining and distribution all contribute to this cost, which is distributed over a relatively small subset of subscribers. Additionally, this narrowcast bandwidth is re-created over and over again to provide service to all subscribers. Regardless of the infrastructure or of the protocol or which component is actually performing the allocation (Business Management System (BMS) 154; Digital Network Control System (DNCS) 308 or VOD Server 105) it is preferred, for operational predictability, that any or all of the components optimize and allocate the bandwidth in the same manner.

When performing traffic model analysis, significant variables that contribute to the performance of the system are the probability of the arrival of the session setup request and the probability of the session hold-time. These variables contribute to the loading factor with respect to a blocking factor, which ultimately determines the number of resources required to serve a given population of users.

Historically, when working with a single encode rate the system-blocking factor was based on the VOD Service Group. With the commingling of different encode rates, a new blocking factor is introduced into the system. This is the QAM blocking factor, and it is based on the probability of having enough bandwidth to support an HD session within a given QAM. While there may be enough bandwidth within the VOD Service Group to support an HD session, if it is not all available on a single QAM channel, the HD session is blocked and the bandwidth is considered "stranded" with regard to its ability to support an HD session. This occurs when the bandwidth consumption on a given QAM exceeds the max rate of the QAM minus the HD rate or, for example, 37.5 Mbps-15 Mbps equaling 22.5 Mbps.

Additionally, the probability of whether the next session request to arrive is either a SD or HD session factors into the allocation technique. This probability is based on multiple factors including HD STB penetration rates, buy rates, demographics and content availability. The hold-time of a session will also be impacted based on the length of HD content offered.

The allocation models presented herein represent a view of the allocation of sessions by ignoring the hold-time of sessions. Presenting this material without representing the departure of session does not invalidate the allocation technique as session hold-time, and thus session departure, has been factored into the allocation models. The reason that it does not invalidate the allocation technique is that each allocation decision is made at the time of session setup with the most current snapshot of bandwidth allocations across all QAMs within the service group.

While the examples are centered around SD content encoded at 3.75 Mbps and HD content at 15 Mbps the allocation technique can easily support multiple SD and multiple HD encode rates by tuning the various parameters. Additionally, service groups with greater than four RF channels are easily supported without any changes.

Non-limiting assumptions for the examples include:
1. Each VOD Service Group includes four 6 MHz RF channels running QAM256.
2. The Standard Definition (SD) rate is 3.75 Mbps. The High Definition (HD) rate is 15 Mbps or four times the SD rate. Thus, the bandwidth requirement for HD is four times that of SD.
3. Every QAM256 channel has the capacity or payload to transport 37.5 Mbps of MPEG-2 video out of a total capacity of 38.8 Mbps. The additional QAM bandwidth is reserved for overhead for encryption, sessions, etc.
4. Although the specification uses sessions as a simplified unit of measure for bandwidth, all decisions are really based on bandwidth and not the number of sessions of a particular rate (of course, other approaches can be used in other instances)
5. The bandwidth utilization and allocation within a QAM does not experience fragmentation as occurs within RAM memory stacks. Thus, there is not the problem of seeking a "largest free block" as all the remainder bandwidth is available for allocation.

Several new variables are introduced in order to provide control of how bandwidth is allocated per service group. They are the VType(2)_Session_Limit and the VType(1)_Session_Limit. Control and flexibility can be attained when these two variables are used in conjunction with an optimized allocation technique.

Configuring the system with hard limits and not oversubscribing the system will reserve bandwidth and guarantee service for each individual service. Configuring the system in an oversubscription model (defining the sum of both variables to a value greater than the total capacity) allows for a floating pool of resources that will be allocated as requests arrive. Oversubscription has the advantage that the bandwidth is not stranded through the reservation process, if there are no requests for that service, while at the same time providing QoS guarantees. The following examples illustrate this.

Example 1

VType(2)_Session_Limit=32 and
VType(1)_Session_Limit=2

The hard limits reserve the bandwidth and guarantee service for both SDVOD and HDVOD—in this case 32 SD sessions and 2 HD sessions. Even if there are no HD sessions and the 33rd SD session request arrives, it will be denied.

Example 2

VType(2)_Session_Limit=40 and
VType(1)_Session_Limit=8

In this totally over-subscribed example setting the variables to their theoretical maximum values allows the system to operate freely without any controls, first come first served.

Example 3

VType(2)_Session_Limit=40 and
VType(1)_Session_Limit=2

This example allows the possibility of no more than two HD sessions, but does not guarantee them while allowing up to 40 SD sessions.

Example 4

VType(2)_Session_Limit=32 and
VType(1)_Session_Limit=8

This example allows the possibility of 32 SD sessions and reserves bandwidth for two HD sessions while supporting the possibility of eight HD sessions.

The allocation technique is preferably optimized to:
Support configurability for a "Least Loaded" and a "Most Loaded" session allocation model
Compromise between load balancing across QAMs and HD session support
Enable lowest impact on active session in the event of failures
Increase the probability of having capacity for an HD session
Establish a mechanism to manage a QoS of SD and HD sessions within a VOD Service Group
Implement business rules guaranteeing service levels for both SD and HD sessions
Support multiple SD and multiple HD encode rates
Support varying number of channels per service group
Allow dynamic tuning of network utilization To maintain parity among implementations of the technique, the following variables types are employed.

---

VType(n)_Threshold: The variable represents the upper bandwidth threshold to switch between the least loaded model to the most loaded model.
VType(n)_Session_Limit: The variable represents the maximum number of simultaneous VType sessions within a VOD Service Group.
VType(n)_Rate: The rate of the VType CODEC.
VType(n)_Session_Count: The variable refers to the number of current VType Sessions.
VType(n): Defines the CODEC type as one of the following HD-MPEG-2 @ 15 Mbps, SD-MPEG-2 @ 3.75 Mbps, HD-H.264 @ 7.5 Mbps, SD-H.264 @ 1.875 Mbps (the H.264 rates are only listed as an example)
VType(1): HD-MPEG-2 @ 15 Mbps
VType(2): SD-MPEG-2 @ 3.75 Mbps
VType(3): HD-H.264 @ 7.5 Mbps
VType(4): SD-H.264 @ 1.875 Mbps
. . .
. . .
Vtype(n): CODEC @ Mbps

---

An initial technique only accounts for MPEG-2 CODEC streams, it being understood that other CODEC and bit-rates can be defined in other versions. In some instances, the VType (1)_Threshold may be set to max bandwidth in a QAM minus the HD encode rate (e.g. 37.5-15=22.5). Once the bandwidth utilization within a QAM for a VOD Service Group reaches this threshold, the allocation technique will start stacking sessions on the least loaded QAM over the VType(1)_Threshold value. By manipulating the VType(1)_Threshold value, the system's performance can be tuned based on the contention found in the system. By setting the VType(1)_Threshold to 37.5 Mbps (the max QAM bandwidth), the technique will allocate in a "least loaded" technique.

Since HD sessions require four times the amount of bandwidth when compared to SD sessions, there needs to be a way of limiting the number of HD sessions so that they cannot use all the bandwidth within a service group, which can result in denial of service. Limiting the number of HD sessions allows for the theoretical reservation of enough bandwidth to support SD VOD sessions. Conversely, limiting the number of SD allows for the theoretical reservation of enough bandwidth to support HD VOD sessions.

Reference should now be had to FIG. 16. Once the VType (1)_Threshold is reached across any QAM within a service group, the technique should start stacking sessions on the QAM channel that has passed VType(1)_Threshold. This method of allocating sessions will increase the probability of having the capacity to support an HD stream. This will allow a mix of 36 SD sessions and one HD session as shown in the figure.

In essence, the session requests that are provisioned below the VType(1)_Threshold are allocated across the QAMs within a VOD Service Group in a "least loaded" model and session requests that are allocated above the VType(1)_ Threshold are allocated in a "most loaded" model. The following are exemplary steps to allocate bandwidth:

1. Determine if the session setup request is either a VType (1)_Rate or VType(2)_Rate
2. Compare the VType(2)_Session_Limit or the VType(1)_ Session_Limit to the new request type and then deny the session setup request if it equals the session limit type (QoS test) else
3. Check the bandwidth utilization across all the QAMs within a VOD Service Group and determine the lowest bandwidth utilization
4. If the lowest bandwidth utilization is below the HD_Threshold value on any QAM, then allocate the bandwidth on the least loaded QAM that has the requested capacity available (if the first QAM does not have the capacity try the next— QAM1→QAM2→QAM3→QAM4→...QAM#n) else
5. Allocate the bandwidth on the most loaded QAM above the VType(1)_Threshold value QAM that has the requested capacity available (if the first QAM does not have the capacity try the next QAM— QAM1→QAM2→QAM3→QAM4→ . . . QAM#n)

By allocating sessions in the manner described above, the session allocation would, in one non-limiting example, appear as in FIG. 17. In this example:

Session 1 through 24 are below the VType(1)_Threshold and are allocated in a "least loaded" model
25th SD session request is above the VType(1)_Threshold and is allocated on the first most loaded QAM channel. In this example, it would be on QAM1.
26th HD session request is above the VType(1)_Threshold and is allocated on the first QAM with enough available bandwidth to support the HD session. In this example, it would be on QAM2.

27th and 28th SD session requests are above the VType(1)_Threshold and are allocated on the first most loaded QAM channel. In this example, it would be on QAM1.

29th HD session request is above the VType(1)_Threshold and is allocated on the first QAM with enough available bandwidth to support the HD session. In this example, it would be on QAM3.

30th SD session request is above the VType(1)_Threshold and is allocated on the first most loaded QAM channel. In this example, it would be on QAM1.

31st, 32nd, 33rd and 34th SD session requests are above the VType(1)_Threshold and are allocated on the first most loaded QAM channel. In this example, it would be on QAM4.

Co-assigned United States Patent Application Publication No. 2007/0076728 of Rieger et al., the complete disclosure of which is expressly incorporated herein by reference in its entirety for all purposes, discloses a self-monitoring and optimizing network apparatus and methods. In an exemplary embodiment, the network comprises a broadcast switched digital architecture, and network bandwidth allocation to multiple digital program streams is performed by processing historical user tuning data, which is obtained directly from the subscriber's consumer premises equipment (e.g., DSTB). When an increase or decrease in bandwidth required to support certain programs is anticipated, network resource re-allocation is performed automatically by a software process running on the switching server. In this fashion, speculative but "intelligent" projections of bandwidth and program stream requirements can be made automatically by the server software, without operator intervention. The server also optionally dictates the optimal monitoring and data collection parameters to the DSTB. Historical data is stored on a CPE.

One or more embodiments manage bandwidth in a video system in an efficient manner, to enhance and preferably maximize the number of channels available to customers, while dynamically allocating bandwidth based on video quality rather than an arbitrary value. It is presently believed that one or more embodiments will be useful in a variety of settings; for example, wherever a control system receives information regarding the quality of video and uses the same to interact with a manager that can then manage bit rate of one or more encoders. Thus, it is presently believed that one or more embodiments will be efficacious for any bandwidth-limited video system.

One or more instances relate to bandwidth management of a switched digital video system wherein from time to time, there are more demands for streams in the system than can currently be allowed (this condition is known in the art as "blocking" as set forth above). One or more embodiments allocate bandwidth via dynamic allocation based on overall system demand.

Figure 18:
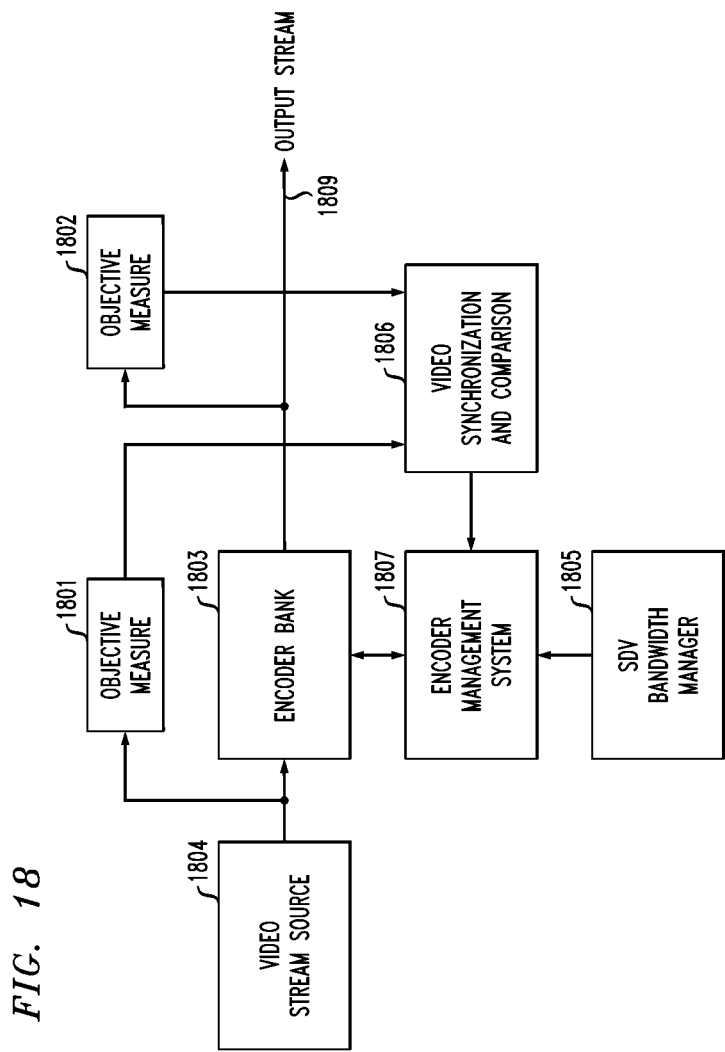
FIG. 18 is a block diagram of an exemplary system, according to an aspect of the invention.

With reference now to FIG. 18, in an exemplary system, according to an aspect of the invention, an input objective measure 1801 and a result objective measure 1802 are directed to look at a program source 1804 and result 1809 which are, respectively, the input and output of an encoder bank 1803. A synchronization and comparison engine 1806 measures the difference between the source 1804 and the result that is being output 1809 for a SDV system. This quality difference is passed to the encoder management system 1807 for monitoring. When the SDV bandwidth manager 1805 determines that it is running low on available bandwidth, the encoder management system 1807 is directed to begin increasing available bandwidth by reducing the bit rate of current streams. In some instances, the increase in available (unused) bandwidth is achieved by decreasing the quality and bit rate of the video streams already present; for example, assume that the quality of the streams has already been balanced and thus reductions in bit rate will degrade quality.

When the result 1809 (i.e. one or more streams encoded at a reduced bit rate) is compared to the source 1804, the comparison system 1806 ensures that the video quality does not degrade beyond predetermined minimum values considered acceptable. In at least some cases, comparison of the output to the source is desirable because it leads to the ability to degrade gracefully and decrease bits based on the incoming quality and effectively manage the consumer experience. If an absolute value is used instead, without comparison of the output to the source, but there is a poor quality stream coming in, the better streams will tend to be penalized (as opposed to the case where source and output are compared and it is known that the poor quality stream is poor coming in and a relative offset versus the initial quality can be carried out—in such a case, the poor quality stream might not be the first selected for degradation but some level of degradation could be employed rather than simply degrading all the streams down to the poor value).

Note that the predetermined minimum values considered acceptable could be, for example, a percentage degradation from the input, an absolute value, or the like.

If the SDV bandwidth manager 1805 determines that the bandwidth is underutilized, it can direct the encoder management system 1807 to increase the video quality values, measure them at 1802, and provide higher bitrates to output streams 1809.

Thus, one or more embodiments employ objective measures to increase and decrease the amount of bandwidth available on a program on an objective quality basis. Instead of using static rates, dynamic rates are used to pass an objective measure back and forth between the SDV bandwidth manager 1805 and the encoder in encoder bank 1803, in order to decrease the bandwidth on specified channels based on current needs.

Accordingly, one or more instances allow a dynamic allocation of video bandwidth to be managed by the SDV manager 1805, which determines where it can decrease the number of bits in a single stream or group of streams without significantly decreasing the video quality for the user experience. The SDV manager 1805 does this by passing one or more bandwidth parameters to encoders in encoder bank 1803 in real time to decrease the bits available on a stream or series of streams until it creates enough free bandwidth to insert another channel. In some instances, such bandwidth parameters include the bandwidth available to the encoder to maximize the number of bits available to the video stream. In typical instances, the variable bit rate (VBR) is actually one of the specified parameters (or the only one). In other cases, the specified parameter(s) indirectly determine the bit rate. In some cases, re-encoding from raw video is carried out. However, in some instances, quantizer scaling metrics can be employed for bit rate control.

Again, in one or more embodiments, actual encoding parameter(s) are changed based on the fact of too much bandwidth currently or imminently being utilized (e.g., a lack of bandwidth being available in terms of the total number of programs that need to be delivered—if using fixed values for video, it would be possible to run out of bandwidth if too many different channels were being requested, but in some cases, if it is noted that bandwidth is falling below a low water mark, it is possible to decrease the quality by decreasing the amount of bandwidth available to the existing video channels to get above the low water mark). In such cases (too much bandwidth currently or imminently being utilized), one or more instances change some of the encoding parameters to somewhat degrade the channel quality, but not so much that it is objectionable, thereby freeing up some additional bandwidth. Because bandwidth is a scarce resource, one or more embodiments employ video quality analysis to change the parameters of the encoder in real time when there are bandwidth limits (i.e., potential blocking). This permits the video quality to be degraded gracefully, rather than arbitrarily by some previously-selected number, and therefore it is possible to regain bandwidth without harming the consumer experience.

One or more instances use a video quality analysis perceptual metric to determine what can and cannot be degraded slightly. Rather than just arbitrarily assign three levels of quality (e.g., "1" is fine; "2" is mildly compromised for bandwidth; and "3" is running out of bandwidth); instead, one or more instances determine how close the network is to running out of bandwidth and then determine what video can be degraded and how can it be degraded in real time to have minimal impact on video quality, yet regain sufficient bandwidth to still add one or more SDV channels. One or more embodiments do not change the resolution of the video; rather, they actually decrease video quality slightly.

As noted, in a SDV system, issues are sometimes encountered wherein the system is close to running out of bandwidth and it is desirable to avoid blocking. As noted above, there are techniques to determine if a particular subscriber is not actually watching (e.g., if no channel change or other remote control input for a long period of time, send a "ping" to the CPE and require a user response; if none is received, assume the channel is no longer being watched by the subscriber of interest) and if so, to "kill" that person's session. In one or more embodiments, instead, choose video streams being played out to consumers and degrade quality minimally to regain enough bandwidth to add another channel. As the system degrades quality, it reduces the number of bits per second given to each consumer or set of consumers so as to be able to slot in another program. In essence, one or more embodiments take a little bit away from "everything" (or at least those streams that can tolerate it without significant quality degradation) so that an additional SDV channel can be added (in some cases, choose the channels that have the highest current quality rating as compared to the bandwidth used, thus penalizing the highest consumers the most until their video quality is on par with all others as a first pass, then equally degrade the video across all networks in service). This type of approach is believed to be fairer to consumers than blocking some consumers from watching a desired program at all.

Referring again to FIG. 18, objective measure blocks 1801, 1802 may be implemented, for example, using known pieces of equipment that perform video quality analysis in real time and can actually indicate how good or bad the video is based on an existing specification from the International Telecommunication Union (ITU); namely, ANSI T1.801.03 1996 Digital Transport of One-Way Video Signals-Parameters for Objective Performance Assessment (different versions or other criteria (e.g., MOS) could be used in some cases). Objective measure blocks 1801, 1802 will rate the input and output video (for example, on a score from 1-5 with decimals allowed) based on straightforward metrics such as blockiness, jitter, blur, jerkiness, and the like.

The skilled artisan will be familiar with the MOS (mean opinion score) measure of video quality per se. One or more embodiments examine the difference between input (e.g., pre-encoded) and output (e.g., post-encoded) values of MOS; frame alignment of the video is preferably carried out in such cases to permit an "apples-to-apples" comparison.

With respect to encoder bank 1803, in at least some instances, all of the video is being re-encoded, which means that it enters the system at block 1804, is taken all the way back down to uncompressed video, and then is recompressed as needed. Video stream source 1804 is the actual source of the video; in the non-limiting example of FIG. 18, it is an MPEG transport stream (but video from any appropriate source can be handled in one or more embodiments; see, e.g. source 102 in FIG. 1 and satellite feed 1108 in FIG. 1A). SDV bandwidth manager 1805 is a piece of equipment that, in essence, allocates the number of bits on a "wire" that an MSO is able to give to a video stream at any given moment, based upon the capacity of the "wire."

In one or more embodiments, SDV bandwidth manager 1805 is implemented using a Cisco Universal Session and Resource Manager available from Scientific-Atlanta, Inc., 5030 Sugarloaf Parkway, Lawrenceville, Ga. 30042-5447 USA, part of Cisco Systems, Inc., San Jose, Calif. USA. However, any suitable SDV session manager can be employed; for example, the switched broadcast manager available from BigBand Networks, Redwood City, Calif. United States, is another non-limiting example.

In general terms, the functionality of bandwidth manager 1805 could be provided in many locations; for example, DBWAD 1001, controller 212. GSRM 302, SDV server 306. SDV manager 522, a dedicated unit in the head end 150 on LAN 158 or LAN 160, or otherwise.

Video synchronization and comparison engine 1806 is equipped to carry out frame synchronization and compare the scores before and after the encoder banks 1803 to determine what the degradation of the video is as a result of the compression methodology. Encoder management system 1807 takes information from the SDV bandwidth manager 1805 (regarding how much bandwidth is available), takes the scores from the video synchronization and comparison engine 1806, and then feeds information back and forth to the encoder bank 1803 to determine which stream gets more or less bits at any one time. Again, 1809 represents the output stream.

In a non-limiting example, objective measure units 1801 and 1802 are servers in the head end 150 and are preferably physically located next to the encoders 1803. In a non-limiting example, they are Dell 1RU servers or the Like. They join the stream in real time and analyze it. The encoder bank 1803 includes encoders inside a video head end 150. The video stream sources 1804 may be thought of as a "cloud" of sources; typically, for an MSO, these include optic cable from a local broadcaster or a satellite link from HBO, CNN or the like, as discussed above. Non-limiting exemplary locations for encoders of encoder bank 1803 include block 162 in FIG. 1A and block 316 in FIG. 11.

Video synchronization and comparison engine 1806 has heretofore typically existed on the same server or other hardware as the objective measure units 1801 and 1802. However, in one or more non-limiting embodiments, video synchronization and comparison engine 1806 is provided on a separate server due to the amount of comparison required. This can be, for example, a conventional WINDOWS server.

With reference to FIG. 18, it should be noted that while objective measurement per se has heretofore been known, one or more embodiments carry out objective measurement in real time, pre- and post-encoder, with frame alignment, using a video synchronization and comparison system 1806 collocated with an encoder bank 1803, and feed the results to encoder management system 1807 for selective bit rate degradation.

In current systems, the encoder management system 1807 is typically located next to the encoder bank 1803 and typically runs the encoders in the encoder bank 1803. A non-limiting example of a suitable system for block 1807 is the NMX Digital Service Manager product (mark of Harmonic Inc., 4300 North First Street, San Jose, Calif. 95134 U.S.A.). In some cases, system 1807 might be located within block 192 in FIG. 9. The SDV bandwidth manager 1805 runs in the head end and takes information from the QAMs (not shown; see examples in other figures) to determine the instantaneous bandwidth utilization and feed such information back to the encoder management system 1807. Thus, in one or more embodiments, other than an external video stream source, all components are in the head end 150.

Recapitulation

Figure 19:
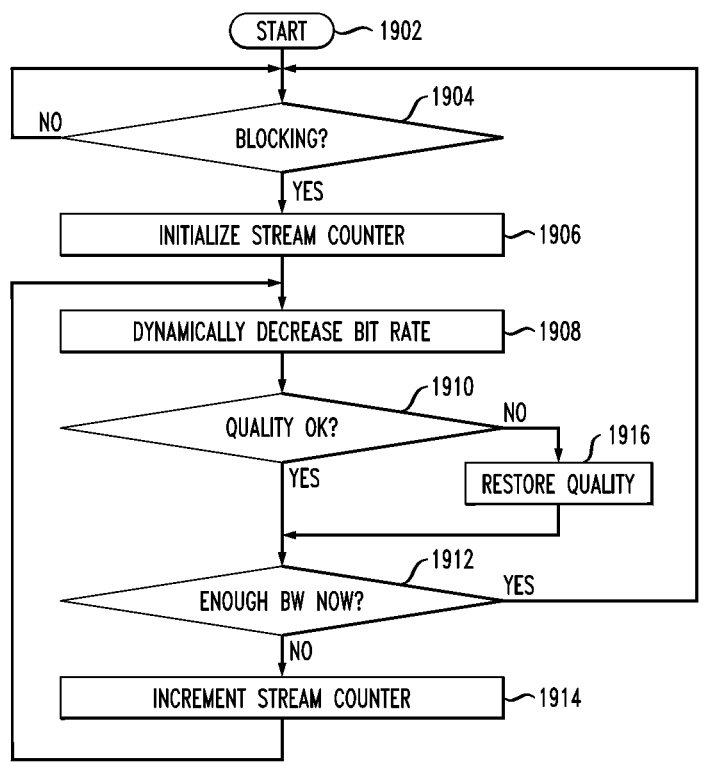
FIGS. 19 and 20 are flow charts of exemplary method steps, according to an aspect of the invention.
Figure 20:
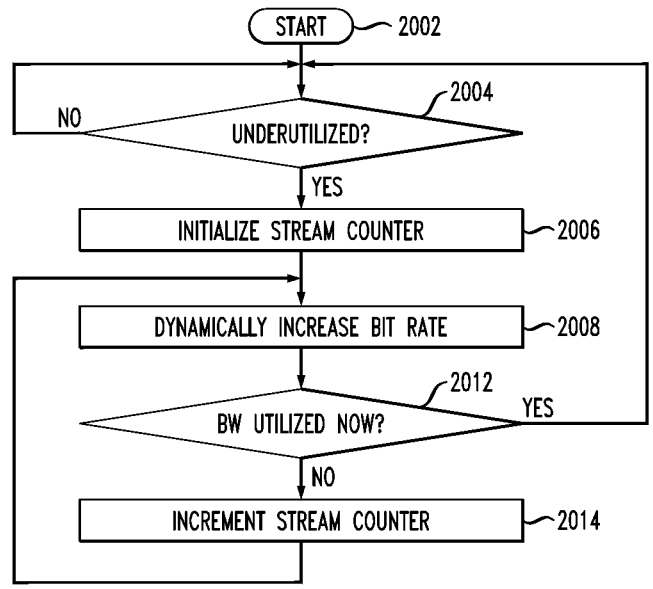

Attention should now be given to the flow charts of FIGS. 19 and 20. One or more embodiments are useful in the context of a switched digital video content-based network (for example, as described above), wherein a head end obtains a first group of program streams and sends to a client only a subset of the program streams selected by subscribers in a neighborhood of the client. Such program streams include at least video streams.

In a non-limiting example, the flow charts of FIGS. 19 and 20 represent monitoring processes which can be executed, logically, in parallel. Referring initially to the flow chart of FIG. 19, which begins in step 1902, it will be appreciated that, in general terms, an exemplary method, according to an aspect of the invention, includes determining at least one of imminence and presence of a condition of inadequate bandwidth, as indicated by the decision block 1904. An additional step (see, for example, blocks 1908-1916 in FIG. 19, discussed further below, for a non-limiting example) includes, responsive to determining imminence and/or presence of the condition of inadequate bandwidth (i.e. "YES" branch of block 1904), dynamically decreasing the bit rate (directly by specifying a reduced bit rate and/or indirectly by specifying some other parameter which results in a reduced bit rate) of at least one of the subset of the program streams selected by the subscribers in the neighborhood of the client by adjusting encoding thereof, while maintaining adequate quality for the stream(s) whose bit rate(s) are being reduced, based on an objective quality measure, in order to address the aforementioned imminence and/or presence of the condition of inadequate bandwidth.

In one or more embodiments, an additional step includes comparing the value of the objective quality measure prior and subsequent to the encoding (e.g., at 1801 and 1802); in such cases, the maintenance of adequate quality (tested, for example, in decision block 1910) is based on the comparison. Non-limiting examples include allowing some maximum percentage of degradation or some absolute value of degradation. At least some instances include real-time comparing with frame synchronization.

In a non-limiting example, decision block 1910 includes ensuring that the objective quality measure subsequent to the encoding has not degraded to less than a predetermined minimum value (otherwise a "NO" is returned, and the quality is restored to an acceptable value). In some cases, the absolute value at 1809 can be compared to an absolute threshold, rather than carrying out a comparison with the input.

In some cases, the objective quality measure takes into account any one, some, or all of blockiness, jitter, blur, and jerkiness. In some instances, ANSI T1.801.03 1996 Digital Transport of One-Way Video Signals-Parameters for Objective Performance Assessment is used as the objective quality measure (different versions or other criteria (e.g. MOS) could be used in some cases).

In at least some cases, the input video streams to the encoder bank 1803 are not compressed, such that the encoding step includes encoding uncompressed video (in this regard, the head end might obtain compressed video from one or more sources, de-compress it, and then such uncompressed video serves as the input to the encoder bank 1803.

Note that a variety of approaches can be used for carrying out the bit rate reduction. For example, in some cases, decrease the bit rate of all currently-transmitted programs at once. In other cases, look for the one (or more) that exceed(s) the minimum quality measure the most, and decrease it/them till there is enough bandwidth for another channel or it/they get to the minimum, then address the next program. In some cases, non-premium channels might be cut first. In some cases, decrease high quality stream(s) until all streams have similar quality and then decrease uniformly.

Referring again back to FIG. 19, if no blocking is detected in decision block 1904, as per the "NO" branch, simply loop back to the beginning and continue to monitor. If actual, or imminent blocking is detected ("YES" branch of block 1904), in a non-limiting example, in step 1906, set a stream counter to identify a first stream that is to have its bit rate reduced (this could be chosen in a number of fashions; for example, the stream with the best current quality, or a stream that is not a premium channel, or some pre-defined numerical order, or the like). Then, in step 1908, dynamically decrease the bit rate for the selected stream, checking in decision block 1910 whether quality is still acceptable and in decision block 1912 whether the bit rate reduction has freed up enough bandwidth.

In the non-limiting example of FIG. 19, if the quality has degraded too much, as per the "NO" branch of decision block 1910, restore the quality to an acceptable value in block 1916 and then proceed to block 1912. If the bit rate has been lowered without a quality issue, simply proceed directly to decision block 1912, as per the "YES" branch of decision block 1910. In decision block 1912, determine whether the bit rate reduction for the stream currently having its bit rate reduced has freed up sufficient bandwidth to relieve the blocking condition. If so, as per the "YES" branch of decision block 1912, return to the beginning and continue to monitor for any new occurrence of blocking. On the other hand, if the bit rate reduction for the stream currently having its bit rate reduced has not freed up sufficient bandwidth to relieve the blocking condition, as per the "NO" branch of decision block 1912, proceed to step 1914 and increment the stream counter and then begin dynamically decrease the bit rate for the new stream corresponding to the incremented stream counter. Continue through the loop until adequate bandwidth is freed up. Note that incrementing the stream counter should be broadly construed to cover a number of different ways for identifying the next stream to have its bit rate reduced.

Attention should now be given to the flow chart of FIG. 20, which begins at 2002. In addition to checking for a blocking condition, during operation of the system, a parallel check can be made for underutilization of bandwidth. Thus, in some instances, an addition step 2004 includes determining imminence and/or presence of a condition of underutilized bandwidth. A further step (see, e.g., steps 2006-2014 in FIG. 20) includes, responsive to the determining of the imminence and/or presence of the condition of underutilized bandwidth (i.e. "YES" branch of decision block 2004), dynamically increasing a bit rate (again, directly and/or indirectly as for the reduction) of at least one of the subset of the program streams selected by the subscribers in the neighborhood of the client by adjusting encoding thereof in order to address the imminence and/or presence of the condition of underutilized bandwidth. Note that indefinite article "a" is used in referring to the bit rate that is to be increased, since, in the general case, any one of the subset of the program streams selected by the subscribers in the neighborhood of the client could be selected to have its bit rate increased, and not necessarily the one (or more) that had bit rates reduced as described in connection with FIG. 19.

Still referring to FIG. 20, if no underutilization is detected in decision block 2004, as per the "NO" branch, simply loop back to the beginning and continue to monitor. If actual, or imminent underutilization is detected ("YES" branch of block 2004), in a non-limiting example, in step 2006, set a stream counter to identify a first stream that is to have its bit rate increased (this could be chosen in a number of fashions; for example, the stream with the worst current quality, or a stream that is a premium channel, or some pre-defined numerical order, or the like). Then, in step 2008, dynamically increase the bit rate for the selected stream, checking in decision block 2012 whether the bit rate increase has ended the underutilization condition.

In the non-limiting example of FIG. 20, in decision block 2012, as noted, determine whether the bit rate increase for the stream currently having its bit rate increased has used up sufficient bandwidth to end the underutilization condition. If so, as per the "YES" branch of decision block 2012, return to the beginning and continue to monitor for any new occurrence of underutilization. On the other hand, if the bit rate increase for the stream currently having its bit rate increased has not used up sufficient bandwidth to end the underutilization condition, as per the "NO" branch of decision block 2012, proceed to step 2014 and increment the stream counter and then begin dynamically increasing the bit rate for the new stream corresponding to the incremented stream counter. Continue through the loop until adequate bandwidth is used up. Note that incrementing the stream counter should be broadly construed to cover a number of different ways for identifying the next stream to have its bit rate increased.

Attention should now again be given again to the block diagram of FIG. 18. It will be appreciated that, in general terms, an exemplary apparatus for use in a switched digital video content-based network, wherein a head end obtains a first group of program streams and sends to a client only a subset of the program streams selected by subscribers in a neighborhood of the client, according to an aspect of the invention, includes an encoder bank 1803 which encodes a plurality of input video streams (e.g., from one or more sources 1804) into a plurality of output video streams 1809. The plurality of input video streams and the plurality of output video streams correspond to the subset of program streams; i.e., the encoding process is carried out on those streams that are actually being watched in the SDV system. Review of the above discussion of FIG. 2 may be helpful at this point.

Also included is a video quality sensing system which determines an objective measure of quality for at least the output video streams. In a non-limiting example, the video quality sensing system includes a comparison system, such as 1806, an input objective measurement block 1801 configured to measure quality of the input video streams and provide same to the comparison system, and an output objective measurement block 1802 configured to measure quality of the output video streams and provide same to the comparison system. In some cases, block 1806 also carries out frame synchronization to ensure comparison of the quality of corresponding frames in the input and output streams. That is, conduct a frame by frame comparison before and after the video encoding process to ensure the video is aligned to match.

Furthermore, the apparatus includes an encoder management system 1807 coupled to the encoder bank 1803 and the video quality sensing system (for example, a comparison system of the video quality sensing system, such as 1806, is coupled to the encoder management system 1807). The apparatus even further includes a switched digital video bandwidth manager 1805 coupled to the encoder management system 1807.

The switched digital video bandwidth manager 1805 is configured to determine, and signal to the encoder management system 1807, imminence and/or presence of a condition of inadequate bandwidth in the switched digital video content-based network. The encoder management system 1807 is configured to (responsive to the signaling) dynamically decrease a bit rate (again, directly and/or indirectly) of one or more of the subset of the program streams selected by the subscribers in the neighborhood of the client, by adjusting encoding thereof. This is done while maintaining adequate quality for the one or more streams, based on communication from the video quality sensing system indicative of the objective measure of quality, in order to address the imminence and/or presence of the condition of inadequate bandwidth.

In one or more embodiments, the comparison system is configured to compare, for a given one of the input video streams 1804, a value from the input objective measurement block 1801 to a value from the output objective measurement block 1802 for a corresponding one of the output video streams. The maintenance of adequate quality by the encoder management system 1807 is based on the comparison. Non-limiting examples include allowing some maximum percentage of degradation or some absolute value of degradation. At least some instances include real-time comparing with frame synchronization.

In some such embodiments, the maintenance of adequate quality by the encoder management system 1807 includes ensuring that the objective quality measure subsequent to the encoding has not degraded to less than a predetermined minimum value.

In some instances, the objective quality measure takes into account any one, some, or all of blockiness, jitter, blur, and jerkiness. A non-limiting example of a suitable objective quality measure is, as noted elsewhere, ANSI T1.801.03 1996 Digital Transport of One-Way Video Signals-Parameters for Objective Performance Assessment (different versions or other criteria (e.g. MOS) could be used in some cases).

As alluded to elsewhere, in some cases, the encoder bank 1803 is configured to encode the plurality of input video streams as uncompressed video.

In some cases, the encoder management system 1807 initially decreases the bit rate for one or more of the subset of program streams that have a high value of the objective quality measure. Optionally, the encoder management system carries out the decreasing of the bit rate for such streams until all of the program streams have a similar value of the objective quality measure, and then decreases the bit rate uniformly for all of the program streams.

In some instances, the exemplary apparatus can implement techniques described with respect to FIG. 20. For example, in some cases, the switched digital video bandwidth manager 1805 is configured to determine, and signal to the encoder management system 1807, imminence and/or presence of a condition of underutilized bandwidth. In such cases, responsive to the signaling, the encoder management system 1807 is configured to dynamically increase a bit rate (again, directly and/or indirectly) of at least one of the subset of program streams selected by the subscribers in the neighborhood of the client by adjusting encoding thereof, in order to address the imminence and/or presence of the condition of underutilized bandwidth.

System and Article of Manufacture Details

The invention can employ hardware or hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 21:
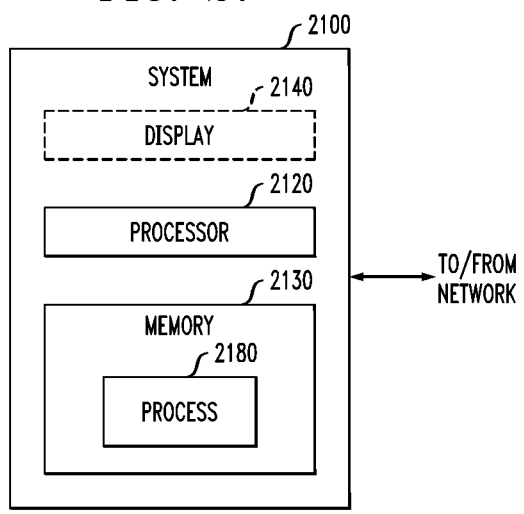
FIG. 21 is a block diagram of an exemplary computer system useful in implementing at least a portion of one or more embodiments of the invention.

FIG. 21 is a block diagram of a system 2100 that can implement part or all of one or more aspects or processes of the present invention, processor 2120 of which is representative of processors associated with servers, clients, set top terminals, DBWAD, SRM, GSRM, controller 212. MAS 104A, engine 1806, management system 1807, bandwidth manager 1805, the server(s) implementing blocks 1801, 1802, and any other elements with processing capability depicted in the other figures. In one or more embodiments, inventive steps are carried out by one or more of the processors in conjunction with one or more interconnecting network(s).

As shown in FIG. 21, memory 2130 configures the processor 2120 to implement one or more aspects of the methods, steps, and functions disclosed herein (collectively, shown as process 2180 in FIG. 21). The memory 2130 could be distributed or local and the processor 2120 could be distributed or singular. The memory 2130 could be implemented as an electrical, magnetic or optical memory, or any combination of these or other types of storage devices. It should be noted that if distributed processors are employed, each distributed processor that makes up processor 2120 generally contains its own addressable memory space. It should also be noted that some or all of computer system 2100 can be incorporated into an application-specific or general-use integrated circuit. For example, one or more method steps could be implemented in hardware in an ASIC rather than using firmware. Display 2140 is representative of a variety of possible input/output devices (e.g. mice, keyboards, printers, etc.).

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks. EEPROMs, or memory cards) or may be a transmission medium a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium which stores instructions and/or data in a non-transitory manner, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

As used herein, including the claims, a "server" includes a physical data processing system (for example, system 2100 as shown in FIG. 21) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/submodules for the controller, DBWAD, SRM/GSRM, MAS, set-top terminal, billing system server, engine 1806, management system 1807, bandwidth manager 1805, the server(s) implementing blocks 1801, 1802, and any other elements with processing capability depicted in the other figures and/or to perform the method steps in FIGS. 19 and 20, and so on). The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. In one or more embodiments, the code is stored in a non-transitory manner.

Non-limiting examples of languages that may be used include markup languages (e.g., hypertext markup language (HTML), extensible markup language (XML), standard generalized markup language (SGML), and the like), C/C++, assembly language, Pascal, Java. EBIF—Extended Binary Interchange Format language, UNIX shell scripts (for example, to generate information to supply to the GSRM), and the like. Note that EBIF would typically only be employed in connection with a set-top box. RTSP and/or RPC can be employed for interface protocols, for example. Furthermore, non-limiting examples of useful database software include Access® software (registered mark of Microsoft Corporation. Redmond, Wash., USA); Oracle® software (registered mark of Oracle International Corporation, 500 Oracle Parkway, Redwood City, Calif. 94065, USA); Informix® software (registered mark of International Business Machines Corporation, Armonk, N.Y., USA); and structured query language (SQL) software available from many sources, including Microsoft Corporation, Redmond, Wash., USA).

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Thus, for example, switching unit 104 and modulator bank 106 (or any other blocks, components, sub-blocks, sub-components, modules and/or sub-modules) may be realized by one or more DSPs. A DSP typically comprises a combination of digital logic devices and other components, which may be a state machine or implemented with a dedicated microprocessor or micro-controller running a software program or having functions programmed in firmware.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
    providing a switched digital video content-based network, wherein a head end obtains a first group of program streams and sends to a client only a subset of said program streams selected by subscribers in a neighborhood of said client by assigning said subset of program streams to transmission channels comprising dedicated frequency bands in said switched digital video content-based network, determining, with a switched digital video bandwidth manager located in said head end, a condition of inadequate bandwidth in that there are or imminently will be an insufficient number of said transmission channels to send to said client said subset of said program streams; and
    responsive to said determining of said condition of inadequate bandwidth by said switched digital video bandwidth manager:
    sending, from said switched digital video bandwidth manager to an encoder management system located in said head end, a signal indicative of said condition of inadequate bandwidth;
    responsive to said signal, said encoder management system causing an encoder bank in said head end to dynamically decrease a bit rate of at least one of said subset of said program streams selected by said subscribers in said neighborhood of said client by adjusting encoding thereof, while maintaining adequate quality for said at least one of said subset of said program streams selected by said subscribers in said neighborhood of said client, based on an objective quality measure obtained by said encoder management system from a video quality sensing system located in said head end, in order to address said condition of inadequate bandwidth, wherein said video quality sensing system comparing values of said objective quality measure of said program streams determined prior to, and immediately subsequent to, said encoding, wherein said maintaining of said adequate quality is based on said comparing of said values of said objective quality measure; and
    sending, from said encoder bank to said client, using one of said transmission channels over a wired network comprising at least one of a fiber optic cable and a coaxial cable, said at least one of said subset of said program streams with said dynamically decreased bit rate, said wired network forming at least a portion of said switched digital video content-based network,
    wherein in said video quality sensing system the method further comprises:
        measuring quality of said program streams prior to encoding by an input objective measurement block;
        measuring quality of said program streams immediately subsequent to encoding by an output objective measurement block; and
        comparing, by a comparison system, for a given one of said program streams, a value from said input objective measurement block to a value from said output objective measurement block for a corresponding one of said program streams, wherein said maintaining of said adequate quality by said encoder management system is based on said comparison.

2. The method of claim 1, wherein said dynamic decreasing of said bit rate comprises said encoder management system directly specifying a reduced value for said bit rate.

3. The method of claim 1, wherein said dynamic decreasing of said bit rate comprises said encoder management system specifying a parameter which indirectly leads to a reduced value for said bit rate.

4. The method of claim 1, wherein said maintaining of said adequate quality is based on said comparing.

5. The method of claim 1, wherein said comparing comprises real-time comparing with frame synchronization.

6. The method of claim 1, wherein said encoding comprises encoding uncompressed video.

7. The method of claim 1, wherein said maintaining of said adequate quality comprises ensuring that said objective quality measure subsequent to said encoding has not degraded to less than a predetermined minimum value.

8. The method of claim 1, wherein said objective quality measure takes into account at least one of blockiness, jitter, blur, and jerkiness.

9. The method of claim 1, wherein said objective quality measure comprises ANSI T1.801.03.

10. The method of claim 1, wherein said objective quality measure comprises mean opinion score.

11. The method of claim 1, wherein said condition of inadequate bandwidth is a condition of underutilized bandwidth, the method further comprising:
responsive to said determining of said condition of underutilized bandwidth by said switched digital video bandwidth manager:
sending, from said switched digital video bandwidth manager to said encoder management system located in said head end, a signal indicative of said condition of underutilized bandwidth;
responsive to said signal, said encoder management system causing an encoder bank in said head end to dynamically increase a bit rate of at least one of said subset of said program streams selected by said subscribers in said neighborhood of said client by adjusting encoding thereof, in order to address said condition of underutilized bandwidth; and
sending, from said encoder bank to said client, using one of said transmission channels over said wired network, said at least one of said subset of said program streams with said dynamically increased bit rate.

12. The method of claim 1, wherein said dynamic decreasing comprises initially decreasing said bit rate for at least one of said subset of program streams having a high value of said objective quality measure.

13. The method of claim 12, further comprising carrying out said decreasing of said bit rate for said at least one of said subset of program streams having said high value of said objective quality measure, until all of said program streams have a similar value of said objective quality measure, and then decreasing said bit rate uniformly for all of said program streams.

14. The method of claim 1, wherein said wired network comprises a hybrid fiber-coaxial arrangement.

15. The method of claim 1, wherein said wired network comprises at least one of a fiber to the home and a fiber to the curb arrangement.

16. An apparatus for use in a switched digital video content-based network, wherein a head end obtains a first group of program streams and sends to a client only a subset of said program streams selected by subscribers in a neighborhood of the client by assigning said subset of program streams to transmission channels comprising dedicated frequency bands in said switched digital video content-based network, said apparatus comprising:
an encoder bank, located in said head end, which encodes a plurality of input video streams into a plurality of output video streams, said plurality of input video streams and said plurality of output video streams corresponding to said subset of said program streams;
a video quality sensing system, located in said head end, which determines an objective measure of quality for at least said output video streams;
an encoder management system, located in said head end, coupled to said encoder bank and said video quality sensing system; and
a switched digital video bandwidth manager, located in said head end, coupled to said encoder management system;
wherein:
said switched digital video bandwidth manager is configured to determine, and signal to said encoder management system, a condition of inadequate bandwidth in the switched digital video content-based network in that there are or imminently will be an insufficient number of said transmission channels to send to said client said subset of said program streams;
responsive to said signaling, said encoder management system is configured to cause said encoder bank to dynamically decrease a bit rate of at least one of said subset of said program streams selected by said subscribers in said neighborhood of said client by adjusting encoding thereof, while maintaining adequate quality for said at least one of said subset of said program streams selected by said subscribers in said neighborhood of said client, based on communication from said video quality sensing system indicative of said objective measure of quality, in order to address said condition of inadequate bandwidth, wherein said maintaining of said adequate quality by said encoder management system comprises ensuring that said objective quality measure subsequent to said encoding has not degraded to less than a predetermined minimum value; and
said encoder bank is configured to send to said client, using one of said transmission channels over a wired network comprising at least one of a fiber optic cable and a coaxial cable, said at least one of said subset of said program streams with said dynamically decreased bit rate, said wired network forming at least a portion of said switched digital video content-based network,
wherein said video quality sensing system in turn comprises:
a comparison system coupled to said encoder management system;
an input objective measurement block configured to measure quality of said input video streams; and
an output objective measurement block configured to measure quality of said output video streams;
wherein said comparison system is configured to compare, for a given one of said input video streams, a value from said input objective measurement block to a value from said output objective measurement block for a corresponding one of said output video streams, wherein said maintaining of said adequate quality by said encoder management system is based on said comparison.

17. The apparatus of claim 16, wherein said dynamic decreasing of said bit rate comprises said encoder management system directly specifying a reduced value for said bit rate.

18. The apparatus of claim 16, wherein said dynamic decreasing of said bit rate comprises said encoder management system specifying a parameter which indirectly leads to a reduced value for said bit rate.

19. The apparatus of claim 16, wherein said comparing comprises real-time comparing with frame synchronization.

20. The apparatus of claim 16, wherein said encoder bank is configured to encode said plurality of input video streams as uncompressed video.

21. The apparatus of claim 16, wherein said objective quality measure takes into account at least one of blockiness, jitter, blur, and jerkiness.

22. The apparatus of claim 16, wherein said objective quality measure comprises ANSI T1.801.03.

23. The apparatus of claim 16, wherein said objective quality measure comprises mean opinion score.

24. The apparatus of claim 16, wherein said condition of inadequate bandwidth is
a condition of underutilized bandwidth; and
responsive to said signaling, said encoder management system is configured to cause said encoder bank to dynamically increase a bit rate of at least one of said subset of said program streams selected by said subscribers in said neighborhood of said client by adjusting encoding thereof, in order to address said condition of underutilized bandwidth, and to send, from said encoder bank to said client, using one of said transmission channels over said wired network, said at least one of said subset of said program streams with said dynamically increased bit rate.

25. The apparatus of claim 16, wherein said encoder management system initially decreases said bit rate for at least one of said subset of program streams having a high value of said objective quality measure.

26. The apparatus of claim 25, wherein said encoder management system carries out said decreasing of said bit rate for said at least one of said subset of program streams having said high value of said objective quality measure, until all of said program streams have a similar value of said objective quality measure, and then decreases said bit rate uniformly for all of said program streams.

27. The apparatus of claim 16, wherein said wired network which said apparatus is configured for use in comprises a hybrid fiber-coaxial arrangement.

28. The apparatus of claim 16, wherein said wired network which said apparatus is configured for use in comprises at least one of a fiber to the home and a fiber to the curb arrangement.

29. An apparatus comprising:
   means for, in a switched digital video content-based network, wherein a head end obtains a first group of program streams and sends to a client only a subset of said program streams selected by subscribers in a neighborhood of said client by assigning said subset of program streams to transmission channels comprising dedicated frequency bands in said switched digital video content-based network, determining a condition of inadequate bandwidth in that there are or imminently will be an insufficient number of said transmission channels to send to said client said subset of said program streams; and
   means for, responsive to said determining of said condition of inadequate bandwidth, dynamically decreasing a bit rate of at least one of said subset of said program streams selected by said subscribers in said neighborhood of said client by adjusting encoding thereof, while maintaining adequate quality for said at least one of said subset of said program streams selected by said subscribers in said neighborhood of said client, based on an objective quality measure, in order to address said condition of inadequate bandwidth, wherein values of said objective quality measure are determined for said program streams prior to and immediately subsequent to said encoding, wherein said maintaining of said adequate quality is based on a comparison of said values of said objective quality measure; and
   means for sending, from said means for dynamically decreasing said bit rate, to said client, using one of said transmission channels over a wired network comprising at least one of a fiber optic cable and a coaxial cable, said at least one of said subset of said program streams with said dynamically decreased bit rate, said wired network forming at least a portion of said switched digital video content-based network,
   wherein said means to address said condition of inadequate bandwidth further comprises:
      an input objective measurement means for measuring quality of said program streams prior to encoding; and
      an output objective measurement means for measuring quality of said program streams immediately subsequent to encoding; and
   a comparison means for comparing, for a given one of said program streams, a value from said input objective measurement means to a value from said output objective measurement means for a corresponding one of said program streams, wherein said maintaining of said adequate quality is based on said comparison.

* * * * *